US007663619B2

(12) United States Patent
Morita

(10) Patent No.: US 7,663,619 B2
(45) Date of Patent: *Feb. 16, 2010

(54) POWER SUPPLY CIRCUIT, DISPLAY DRIVER, ELECTRO-OPTICAL DEVICE, ELECTRONIC INSTRUMENT, AND METHOD OF CONTROLLING POWER SUPPLY CIRCUIT

(75) Inventor: Akira Morita, Suwa (JP)

(73) Assignee: Seiko Epson Corporation (JP)

( * ) Notice: Subject to any disclaimer, the term of this patent is extended or adjusted under 35 U.S.C. 154(b) by 690 days.

This patent is subject to a terminal disclaimer.

(21) Appl. No.: 11/311,850

(22) Filed: Dec. 19, 2005

(65) Prior Publication Data

US 2006/0132418 A1 Jun. 22, 2006

(30) Foreign Application Priority Data

Dec. 21, 2004 (JP) ............................ 2004-369589

(51) Int. Cl.
*G06F 3/038* (2006.01)
*G09G 3/36* (2006.01)

(52) U.S. Cl. ........................... 345/212; 345/55; 345/84; 345/87; 345/204; 345/211

(58) Field of Classification Search .................. 345/55, 345/76, 79, 84, 87, 94, 96, 98, 100, 204, 345/211, 212, 213, 214, 690; 315/160, 167, 315/169.1, 169.2, 194, 195, 197; 348/725, 348/730

See application file for complete search history.

(56) References Cited

U.S. PATENT DOCUMENTS 6,529,180 B1 * 3/2003 Ito et al. ....................... 345/89
6,529,181 B2 * 3/2003 Nakano et al. ................ 345/98
6,762,565 B2 * 7/2004 Kudo et al. .............. 315/169.2
7,078,864 B2 7/2006 Kudo et al.
7,106,321 B2 * 9/2006 Morita ....................... 345/211

(Continued)

FOREIGN PATENT DOCUMENTS

JP 11-015444 1/1999
JP 11-288255 10/1999
JP 2000-276111 10/2000
JP 2002-366114 12/2002
JP 2004-184840 7/2004

OTHER PUBLICATIONS

"slew." Merriam-Webster Online Dictionary. 2009. Merriam-Webster Online. Apr. 11, 2009; <http://www.merriam-webster.com/dictionary/slew>.*

*Primary Examiner*—My-Chau T Tran
(74) *Attorney, Agent, or Firm*—Harness, Dickey & Pierce, P.L.C.

(57) ABSTRACT

A power supply circuit including: a high-potential-side voltage generation circuit which generates a high-potential-side voltage to be supplied to the common electrode; a low-potential-side voltage generation circuit which generates a low-potential-side voltage to be supplied to the common electrode; and a switch circuit which alternately supplies the high-potential-side voltage and the low-potential-side voltage to the common electrode as a common electrode voltage. The power supply circuit performs supply capability control of the common electrode voltage which changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode.

30 Claims, 30 Drawing Sheets

U.S. PATENT DOCUMENTS 7,173,614 B2 * 2/2007 Morita ........................ 345/211
7,286,125 B2 * 10/2007 Morita ........................ 345/211
7,295,198 B2 * 11/2007 Nishimura .................. 345/211
7,375,705 B2 * 5/2008 Morita ........................ 345/76
2004/0145583 A1 7/2004 Morita
2005/0156924 A1 * 7/2005 Nishimura .................. 345/211
2005/0195149 A1 * 9/2005 Ito .............................. 345/98
2006/0007095 A1 1/2006 Kudo et al.
2006/0132419 A1 * 6/2006 Morita ........................ 345/98
2006/0158412 A1 * 7/2006 Morita ........................ 345/94
2006/0158413 A1 * 7/2006 Morita ........................ 345/94
2008/0084410 A1 * 4/2008 Uehara ........................ 345/211
2008/0165212 A1 * 7/2008 Morita ........................ 345/690
2008/0174285 A1 * 7/2008 Morita ........................ 323/268
2008/0174585 A1 * 7/2008 Morita ........................ 345/211
2008/0186297 A1 * 8/2008 Morita ........................ 345/211
2009/0079495 A1 * 3/2009 Morita ........................ 327/538
2009/0079767 A1 * 3/2009 Morita ........................ 345/690

* cited by examiner

FIG.21

| LINE VALUE | TRP1 | TRP2 | TRN1 | TRN2 | VREFN1 VREFN2 | OFFSET | CK |
|---|---|---|---|---|---|---|---|
| 0 | OFF | OFF | ON | ON | OFF | OFF | 1/2 |
| 4 | OFF | OFF | ON | ON | OFF | OFF | 1/2 |
| 8 | OFF | OFF | ON | OFF | OFF | OFF | 1 |
| 12 | OFF | OFF | ON | OFF | ON | OFF | 1 |
| 16 | OFF | OFF | OFF | ON | ON | OFF | 1 |
| 20 | OFF | OFF | OFF | ON | ON | OFF | 1 |
| 24 | OFF | OFF | OFF | ON | ON | OFF | 1 |
| 28 | OFF | OFF | OFF | OFF | OFF | ON | 1 |
| 32 | OFF | OFF | OFF | OFF | OFF | ON | 1 |
| 36 | OFF | OFF | OFF | OFF | ON | ON | 1 |
| 40 | OFF | ON | OFF | OFF | ON | ON | 1 |
| 44 | OFF | ON | OFF | OFF | ON | OFF | 1 |
| 48 | ON | OFF | OFF | OFF | ON | OFF | 1 |
| 52 | ON | OFF | OFF | OFF | ON | OFF | 1 |
| 56 | ON | ON | OFF | OFF | ON | OFF | 1 |
| 60 | ON | ON | OFF | OFF | ON | OFF | 1 |
| 63 | ON | ON | OFF | OFF | ON | OFF | 1 |

FIG.22

| LINE VALUE | TRP1 | | TRN1 | | VREFN1 | | OFFSET | |
|---|---|---|---|---|---|---|---|---|
| | ON | OFF | ON | OFF | ON | OFF | ON | OFF |
| 0 | 0 | 0 | 0 | 0 | 0 | 0 | 0 | 0 |
| 4 | 0 | 0 | 0 | 0 | 0 | 0 | 0 | 0 |
| 8 | 0 | 0 | 0 | 0 | 0 | 2 | 0 | 0 |
| 12 | 0 | 0 | 0 | 0 | 0 | 4 | 0 | 0 |
| 16 | 0 | 0 | 0 | 0 | 0 | 6 | 0 | 0 |
| 20 | 0 | 0 | 0 | 0 | 0 | 7 | 0 | 0 |
| 24 | 0 | 0 | 0 | 0 | 0 | 0 | 0 | 2 |
| 28 | 0 | 0 | 0 | 0 | 0 | 0 | 0 | 4 |
| 32 | 0 | 0 | 0 | 0 | 0 | 6 | 0 | 6 |
| 36 | 0 | 0 | 0 | 0 | 0 | 7 | 0 | 7 |
| 40 | 0 | 0 | 0 | 2 | 2 | 6 | 0 | 0 |
| 44 | 0 | 0 | 0 | 4 | 4 | 7 | 0 | 0 |
| 48 | 0 | 2 | 0 | 0 | 2 | 7 | 0 | 0 |
| 52 | 0 | 4 | 0 | 0 | 4 | 7 | 0 | 0 |
| 56 | 0 | 5 | 0 | 2 | 5 | 9 | 0 | 0 |
| 60 | 0 | 6 | 0 | 4 | 6 | 9 | 0 | 0 |
| 63 | 0 | 7 | 0 | 7 | 7 | 9 | 0 | 0 |

FIG.25

| | VOLTAGE CHANGE PERIOD | GRAYSCALE OUTPUT PERIOD |
|---|---|---|
| LINE VALUE | PRECEDING LINE VALUE | PRESENT LINE VALUE + f (PRECEDING LINE VALUE) |

POWER SUPPLY CIRCUIT, DISPLAY DRIVER, ELECTRO-OPTICAL DEVICE, ELECTRONIC INSTRUMENT, AND METHOD OF CONTROLLING POWER SUPPLY CIRCUIT

Japanese Patent Application No. 2004-369589, filed on Dec. 21, 2004, is hereby incorporated by reference in its entirety.

BACKGROUND OF THE INVENTION

The present invention relates to a power supply circuit, a display driver, an electro-optical device, an electronic instrument, and a method of controlling a power supply circuit.

As a liquid crystal display (LCD) panel (display panel in a broad sense) used in an electronic instrument such as a portable telephone, a simple matrix type LCD panel and an active matrix type LCD panel using a switch element such as a thin film transistor (hereinafter abbreviated as "TFT") have been known.

The simple matrix type LCD panel easily reduces power consumption in comparison with the active matrix type LCD panel. However, it is difficult to increase the number of colors and display a video in the simple matrix type LCD panel. The active matrix type LCD panel is suitable for increasing the number of colors and displaying a video. However, it is difficult to reduce power consumption of the active matrix type LCD panel.

In recent years, an increase in the number of colors and display of a video have been increasingly demanded for a portable electronic instrument such as a portable telephone in order to display a high-quality image. Therefore, the active matrix type LCD panel has been widely used instead of the simple matrix type LCD panel.

The simple matrix type LCD panel or the active matrix type LCD panel is driven so that the voltage applied to a liquid crystal forming a pixel is alternately changed. As such an alternating drive method, a line inversion drive and a field inversion drive (frame inversion drive) have been known. In the line inversion drive, the polarity of the voltage applied to the liquid crystal is reversed in units of one or more scan lines. In the field inversion drive, the polarity of the voltage applied to the liquid crystal is reversed in field (frame) units.

The voltage level applied to a pixel electrode forming a pixel can be decreased by changing a common electrode voltage (common voltage) supplied to a common electrode opposite to the pixel electrode corresponding to inversion drive timing.

The inversion drive increases power consumption since an electric charge is repeatedly charged and discharged. JP-A-2004-184840 discloses a technology of reducing power consumption by reutilizing an electric charge discharged from a data line of the LCD panel.

However, the load of the common electrode of the LCD panel is almost constant, and the power supply capability of a power supply circuit which supplies the common electrode voltage is determined taking into consideration the maximum value of the amount of electric charge to be charged and discharged. Therefore, unnecessary power consumption occurs when the power supply capability is not required.

In recent years, an increase in resolution and grayscale of the LCD panel has been demanded. Therefore, an accurate and high drive capability is required so that current consumption is increased. Therefore, the image quality of the LCD panel is affected by only a small amount of change in. voltage level or the like, so that a horizontal crosstalk problem or the like occurs.

SUMMARY

According to a first aspect of the invention, there is provided a power supply circuit which supplies voltage to a common electrode which is opposite to a pixel electrode, an electro-optical substance being interposed between the common electrode and the pixel electrode, the power supply circuit comprising:

a high-potential-side voltage generation circuit which generates a high-potential-side voltage to be supplied to the common electrode;

a low-potential-side voltage generation circuit which generates a low-potential-side voltage to be supplied to the common electrode; and a switch circuit which alternately supplies the high-potential-side voltage and the low-potential-side voltage to the common electrode as a common electrode voltage, the power supply circuit performing supply capability control of the common electrode voltage which changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode.

According to a second aspect of the invention, there is provided a power supply circuit which supplies voltage to a common electrode which is opposite to a pixel electrode, an electro-optical substance being interposed between the common electrode and the pixel electrode, the power supply circuit comprising:

a circuit which alternately supplies a high-potential-side voltage and a low-potential-side voltage to the common electrode, the power supply circuit performing supply capability control of a common electrode voltage which changes at least one of current drive capability and an output voltage level of the circuit which alternately supplies the high-potential-side voltage and the low-potential-side voltage to the common electrode according to line data including grayscale data for the number of dots of one scan line, each dot corresponding to voltage applied to the pixel electrode.

According to a third aspect of the invention, there is provided a display driver comprising:

a driver circuit which supplies a drive voltage corresponding to grayscale data to a data line electrically connected to the pixel electrode; and any of the above-described power supply circuits which performs the supply capability control by using the line data corresponding to the grayscale data.

According to a fourth aspect of the invention, there is provided an electro-optical device comprising:

a plurality of scan lines;

a plurality of data lines;

a plurality of pixel electrodes, each of the pixel electrodes being specified by one of the scan lines and one of the data lines;

a common electrode which is opposite to the pixel electrodes, an electro-optical substance being interposed between the common electrode and the pixel electrodes;

a display driver which drives the data lines; and any of the above-described power supply circuits which alternately supplies the high-potential-side voltage and the low-potential-side voltage to the common electrode.

According to a fifth aspect of the invention, there is provided an electronic instrument comprising any of the above-described power supply circuits.

According to a sixth aspect of the invention, there is provided a method of controlling a power supply circuit including a high-potential-side voltage generation circuit and a low-potential-side voltage generation circuit, the high-potential-side voltage generation circuit generating a high-potential-side voltage to be supplied to a common electrode which is opposite to a pixel electrode, an electro-optical substance being interposed between the common electrode and the pixel electrode, the low-potential-side voltage generation circuit generating a low-potential-side voltage to be supplied to the common electrode, and the method comprising:

changing at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode; and alternately supplying the high-potential-side voltage and the low-potential-side voltage to the common electrode.

BRIEF DESCRIPTION OF THE SEVERAL VIEWS OF THE DRAWING

FIG. 21 is a diagram showing an example of a power supply capability setting register.

FIG. 22 is a diagram showing another example of the power supply capability setting register.

FIG. 25 shows an example of a line value in each period supplied from a data driver.

DETAILED DESCRIPTION OF THE EMBODIMENT

Figure 1:
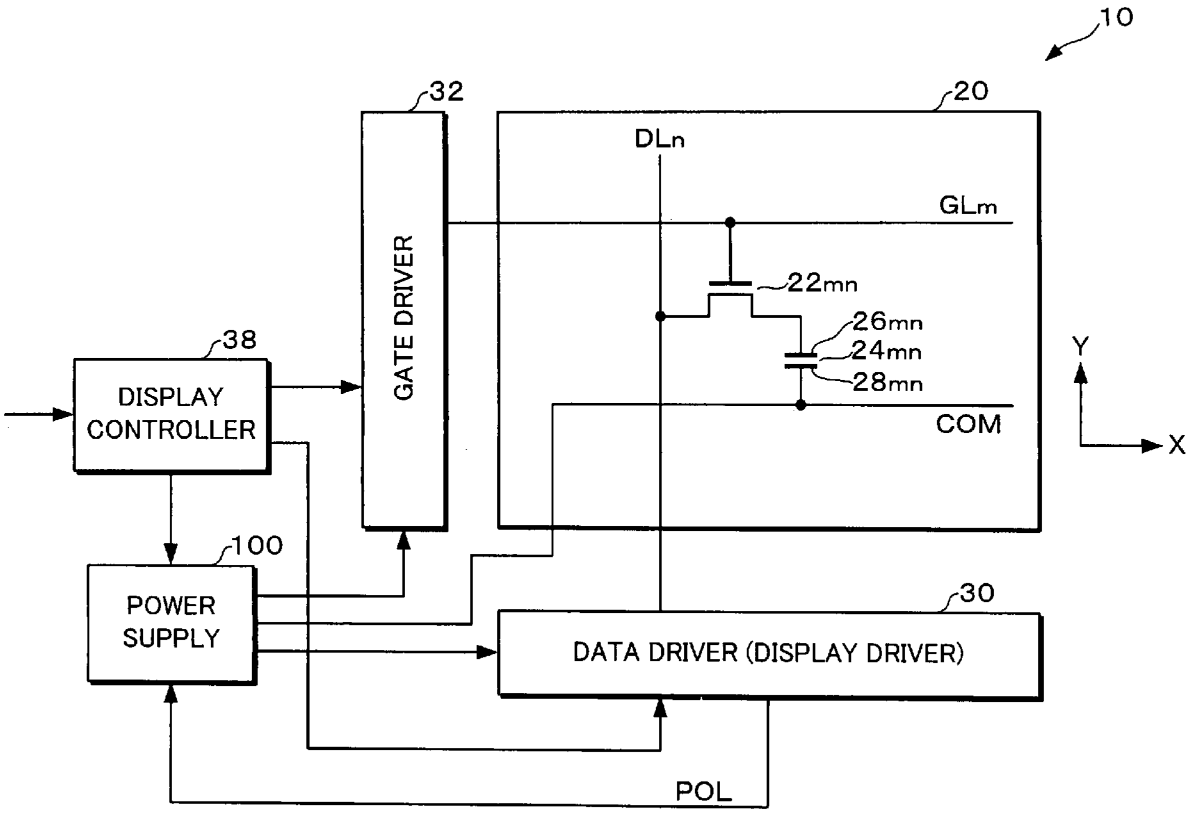
FIG. 1 is a block diagram showing a configuration example of a liquid crystal display device to which a power supply circuit according to one embodiment of the invention is applied.

The invention may provide a power supply circuit, a display driver, an electro-optical device, an electronic instrument, and a method of controlling a power supply circuit which enable to supply voltage to a common electrode without consuming a large amount of power and affecting the image quality.

According to one embodiment of the invention, there is provided a power supply circuit which supplies voltage to a common electrode which is opposite to a pixel electrode, an electro-optical substance being interposed between the common electrode and the pixel electrode, the power supply circuit comprising:

a high-potential-side voltage generation circuit which generates a high-potential-side voltage to be supplied to the common electrode;

a low-potential-side voltage generation circuit which generates a low-potential-side voltage to be supplied to the common electrode; and a switch circuit which alternately supplies the high-potential-side voltage and the low-potential-side voltage to the common electrode as a common electrode voltage, the power supply circuit performing supply capability control of the common electrode voltage which changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode.

In this embodiment, the common electrode to which the voltage is supplied is capacitively coupled with the pixel electrode. The transmissivity is changed corresponding to the voltage between the common electrode and the pixel electrode. Therefore, a change in the voltage between the common electrode and the pixel electrode affects the image quality as the number of grayscales is increased.

In this embodiment, at least one of the current drive capability and the output voltage level for supplying the high-potential-side voltage and the low-potential-side voltage of the common electrode voltage is changed. At least one of the current drive capability and the output voltage level is changed corresponding to the line data including the grayscale data for the number of dots of one scan line. Therefore, the common electrode voltage supply capability can be determined without taking into consideration the maximum value of the amount of electric charge which must be charged into or discharged from the common electrode. Therefore, this embodiment prevents occurrence of a situation in which unnecessary power consumption occurs when a high voltage supply capability is not required. This enables provision of a power supply circuit which can accurately set the common electrode voltage at low power consumption.

The power supply circuit may comprise:

a first conductivity type first auxiliary transistor to which a high-potential-side power supply voltage of the high-potential-side voltage generation circuit is supplied at a source and which is electrically connected to an output of the switch circuit at a drain, wherein the supply capability control is performed by changing a gate voltage of the first auxiliary transistor according to the line data.

Since the capability of setting the high-potential-side voltage of the common electrode voltage can be increased according to the line data, unnecessary current consumption can be reduced.

The power supply circuit may comprise:

a second conductivity type second auxiliary transistor to which a low-potential-side power supply voltage of the low-potential-side voltage generation circuit is supplied at a source and which is electrically connected to an output of the switch circuit at a drain, wherein the supply capability control is performed by changing a gate voltage of the second auxiliary transistor according to the line data.

Since the capability of setting the low-potential-side voltage of the common electrode voltage can be increased according to the line data, unnecessary current consumption can be reduced.

In this power supply circuit, the high-potential-side voltage generation circuit may include a first operational amplifier which outputs the high-potential-side voltage based on a high-potential-side input voltage.

In this power supply circuit, the supply capability control may be performed by changing at least one of current drive capability and a slew rate of the first operational amplifier according to the line data.

In this power supply circuit, the supply capability control may be performed by changing the high-potential-side input voltage according to the line data.

In this power supply circuit, the supply capability control may be performed by stopping or limiting an operating current of the first operational amplifier and electrically connecting an input and an output of the first operational amplifier according to the line data.

Since the capability of generating the high-potential-side voltage of the common electrode voltage can be changed according to the line data, unnecessary current consumption can be reduced.

The power supply circuit may comprise:

a first charge-pump circuit which generates a high-potential-side power supply voltage of the high-potential-side voltage generation circuit by a charge-pump operation in synchronization with a first charge clock signal, wherein the supply capability control is performed by stopping the first charge clock signal or reducing frequency of the first charge clock signal according to the line data.

Since an accurate high-potential-side power supply voltage can be generated while consuming power only when the accuracy of the voltage level of the high-potential-side power supply voltage is necessary, unnecessary current consumption can be reduced.

In this power supply circuit, the low-potential-side voltage generation circuit may include a second operational amplifier which outputs the low-potential-side voltage based on a low-potential-side input voltage.

In this power supply circuit, the supply capability control may be performed by changing at least one of current drive capability and a slew rate of the second operational amplifier according to the line data.

In this power supply circuit, the supply capability control may be performed by changing the low-potential-side input voltage according to the line data.

In this power supply circuit, the supply capability control may be performed by stopping or limiting an operating current of the second operational amplifier and electrically connecting an input and an output of the second operational amplifier according to the line data.

Since the capability of generating the low-potential-side voltage of the common electrode voltage can be changed according to the line data, unnecessary current consumption can be reduced.

The power supply circuit may comprise:

a second charge-pump circuit which generates a low-potential-side power supply voltage of the low-potential-side voltage generation circuit by a charge-pump operation in synchronization with a second charge clock signal, wherein the supply capability control is performed by stopping the second charge clock signal or reducing frequency of the second charge clock signal according to the line data.

Since an accurate low-potential-side power supply voltage can be generated while consuming power only when the accuracy of the voltage level of the low-potential-side power supply voltage is necessary, unnecessary current consumption can be reduced.

According to one embodiment of the invention, there is provided a power supply circuit which supplies voltage to a common electrode which is opposite to a pixel electrode, an electro-optical substance being interposed between the common electrode and the pixel electrode, the power supply circuit comprising:

a circuit which alternately supplies a high-potential-side voltage and a low-potential-side voltage to the common electrode, the power supply circuit performing supply capability control of a common electrode voltage which changes at least one of current drive capability and an output voltage level of the circuit which alternately supplies the high-potential-side voltage and the low-potential-side voltage to the common electrode according to line data including grayscale data for the number of dots of one scan line, each dot corresponding to voltage applied to the pixel electrode.

In this embodiment, since the supply capability of the common electrode voltage is controlled corresponding to the line data including the grayscale data for the number of dots of one scan line, the common electrode voltage supply capability can be determined without taking into consideration the maximum value of the amount of electric charge which must be charged into or discharged from the common electrode. Therefore, it is possible to prevent occurrence of a situation in which unnecessary power consumption occurs when a high voltage supply capability is not required. This enables provision of a power supply circuit which can accurately set the common electrode voltage at low power consumption.

In this power supply circuit, the supply capability control may be performed only in a period determined based on the line data.

In this power supply circuit, the supply capability control may be performed according to an amount of change for one scan line between the line data in a present horizontal scan period and the line data in a horizontal scan period immediately before the present horizontal scan period, instead of the line data.

In this power supply circuit, the supply capability control may be performed in a period corresponding to the amount of change for one scan line between the line data in the present horizontal scan period and the line data in the horizontal scan period immediately before the present horizontal scan period.

In this power supply circuit, the line data may include the grayscale data for the number of a part of dots of one scan line.

In this power supply circuit, when the grayscale data of each dot is j bits (j is an integer greater than one), the line data may include higher-order k-bit ($k<j$, k is a natural number) data of the grayscale data of each dot for the number of dots of one scan line.

In this power supply circuit, k may be one.

According to one embodiment of the invention, there is provided a display driver comprising:

a driver circuit which supplies a drive voltage corresponding to grayscale data to a data line electrically connected to the pixel electrode; and any of the above-described power supply circuits which performs the supply capability control by using the line data corresponding to the grayscale data.

This embodiment can provide a display driver including a power supply circuit which supplies voltage to the common electrode without consuming a large amount of power and affecting the image quality.

According to one embodiment of the invention, there is provided an electro-optical device comprising:

a plurality of scan lines;

a plurality of data lines;

a plurality of pixel electrodes, each of the pixel electrodes being specified by one of the scan lines and one of the data lines;

a common electrode which is opposite to the pixel electrodes, an electro-optical substance being interposed between the common electrode and the pixel electrodes;

a display driver which drives the data lines; and any of the above-described power supply circuits which alternately supplies the high-potential-side voltage and the low-potential-side voltage to the common electrode.

This embodiment can provide an electro-optical device including a power supply circuit which supplies voltage to the common electrode without consuming a large amount of power and affecting the image quality.

According to one embodiment of the invention, there is provided an electronic instrument comprising any of the above-described power supply circuits.

This embodiment can provide an electronic instrument including a power supply circuit which supplies voltage to the common electrode without consuming a large amount of power and affecting the image quality.

According to one embodiment of the invention, there is provided a method of controlling a power supply circuit including a high-potential-side voltage generation circuit and a low-potential-side voltage generation circuit, the high-potential-side voltage generation circuit generating a high-potential-side voltage to be supplied to a common electrode which is opposite to a pixel electrode, an electro-optical substance being interposed between the common electrode and the pixel electrode, the low-potential-side voltage generation circuit generating a low-potential-side voltage to be supplied to the common electrode, and the method comprising:

changing at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode; and alternately supplying the high-potential-side voltage and the low-potential-side voltage to the common electrode.

In this method of controlling a power supply circuit, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit may be changed only in a period determined based on the line data.

In this method of controlling a power supply circuit, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit may be changed according to an amount of change for one scan line between the line data in a present horizontal scan period and the line data in a horizontal scan period immediately before the present horizontal scan period.

In this method of controlling a power supply circuit, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit may be changed only in a period corresponding to the amount of change for one scan line between the line data in the present horizontal scan period and the line data in the horizontal scan period immediately before the present horizontal scan period.

In this method of controlling a power supply circuit, the line data may include the grayscale data for the number of a part of dots of one scan line.

In this method of controlling a power supply circuit, when the grayscale data of each dot is j bits (j is an integer greater than one), the line data may include higher-order k-bit ($k<j$, k is a natural number) data of the grayscale data of each dot for the number of dots of one scan line.

In this method of controlling a power supply circuit, k may be one.

These embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

1. Liquid Crystal Display Device

FIG. 1 shows an outline of a configuration of an active matrix type liquid crystal display device to which a power supply circuit according to one embodiment of the invention is applied.

A liquid crystal display device 10 includes an LCD panel (display panel in a broad sense; electro-optical device in a broader sense) 20. The LCD panel 20 is formed on a glass substrate, for example. A plurality of scan lines (gate lines) GL1 to GLM (M is an integer greater than one), arranged in a direction Y and extending in a direction X, and a plurality of data lines (source lines) DL1 to DLN (N is an integer greater than one), arranged in the direction X and extending in the direction Y, are disposed on the glass substrate. A pixel area (pixel) is provided corresponding to the intersecting position of the scan line GLm ($1 \leqq m \leqq M$, m is an integer; hereinafter the same) and the data line DLn ($1 \leqq n \leqq N$, n is an integer; hereinafter the same). A thin film transistor (hereinafter abbreviated as "TFT") 22mn is disposed in the pixel area.

A gate of the TFT 22mn is connected with the scan line GLm. A source of the TFT 22mn is connected with the data line DLn. The drain of the TFT 22mn is connected with a pixel electrode 26mn . A liquid crystal (electro-optical substance in a broad sense) is sealed between the pixel electrode 26mn and a common electrode 28mn (common electrode COM) opposite to the pixel electrode 26mn so that a liquid crystal capacitor (liquid crystal element in a broad sense) 24mn is formed. The transmissivity of the pixel changes corresponding to the voltage applied between the pixel electrode 26mn and the common electrode 28mn . A common electrode voltage VCOM is supplied to the common electrode 28mn.

The LCD panel 20 is formed by attaching a first substrate, on which the pixel electrode and the TFT are formed, to a second substrate, on which the common electrode is formed, and sealing a liquid crystal as the electro-optical substance between the substrates, for example.

The liquid crystal display device 10 includes a data driver (display driver in a broad sense) 30. The data driver 30 drives the data lines DL1 to DLN of the LCD panel 20 based on grayscale data.

The liquid crystal display device 10 may include a gate driver (display driver in a broad sense) 32. The gate driver 32 sequentially drives (scans) the scan lines GL1 to GLM of the LCD panel 20 within one vertical scan period.

The liquid crystal display device 10 includes a power supply circuit 100. The power supply circuit 100 generates voltages necessary for driving the data lines, and supplies the generated voltages to the data driver 30. The power supply circuit 100 generates power supply voltages VDD and VSS necessary for the data driver 30 to drive the data lines and voltages for a logic section of the data driver 30, for example. The power supply circuit 100 also generates a voltage necessary for driving (scanning) the scan lines, and supplies the generated voltage to the gate driver 32.

The power supply circuit 100 also generates the common electrode voltage VCOM. Specifically, the power supply circuit 100 outputs the common electrode voltage VCOM, which alternately changes between a high-potential-side voltage VCOMH and a low-potential-side voltage VCOML in synchronization with the timing of a polarity inversion signal POL generated by the data driver 30, to the common electrode of the LCD panel 20. The common electrode of each pixel is set at the same potential, for example. In FIG. 1, the common electrode of each pixel is illustrated as the common electrode COM.

The liquid crystal display device 10 may include a display controller 38. The display controller 38 controls the data driver 30, the gate driver 32, and the power supply circuit 100 according to the content set by a host (not shown) such as a central processing unit (hereinafter abbreviated as "CPU"). For example, the display controller 38 sets the operation mode, the polarity inversion drive, and the polarity inversion timing of the data driver 30 and the gate driver 32, and supplies a vertical synchronization signal and a horizontal synchronization signal generated therein to the data driver 30 and the data driver 32.

In FIG. 1, the liquid crystal display device 10 is configured to include the power supply circuit 100 and the display controller 38. However, at least one of the power supply circuit 100 and the display controller 38 may be provided outside the liquid crystal display device 10. Or, the liquid crystal display device 10 may be configured to include the host.

The data driver 30 may include at least one of the gate driver 32 and the power supply circuit 100.

Figure 2:
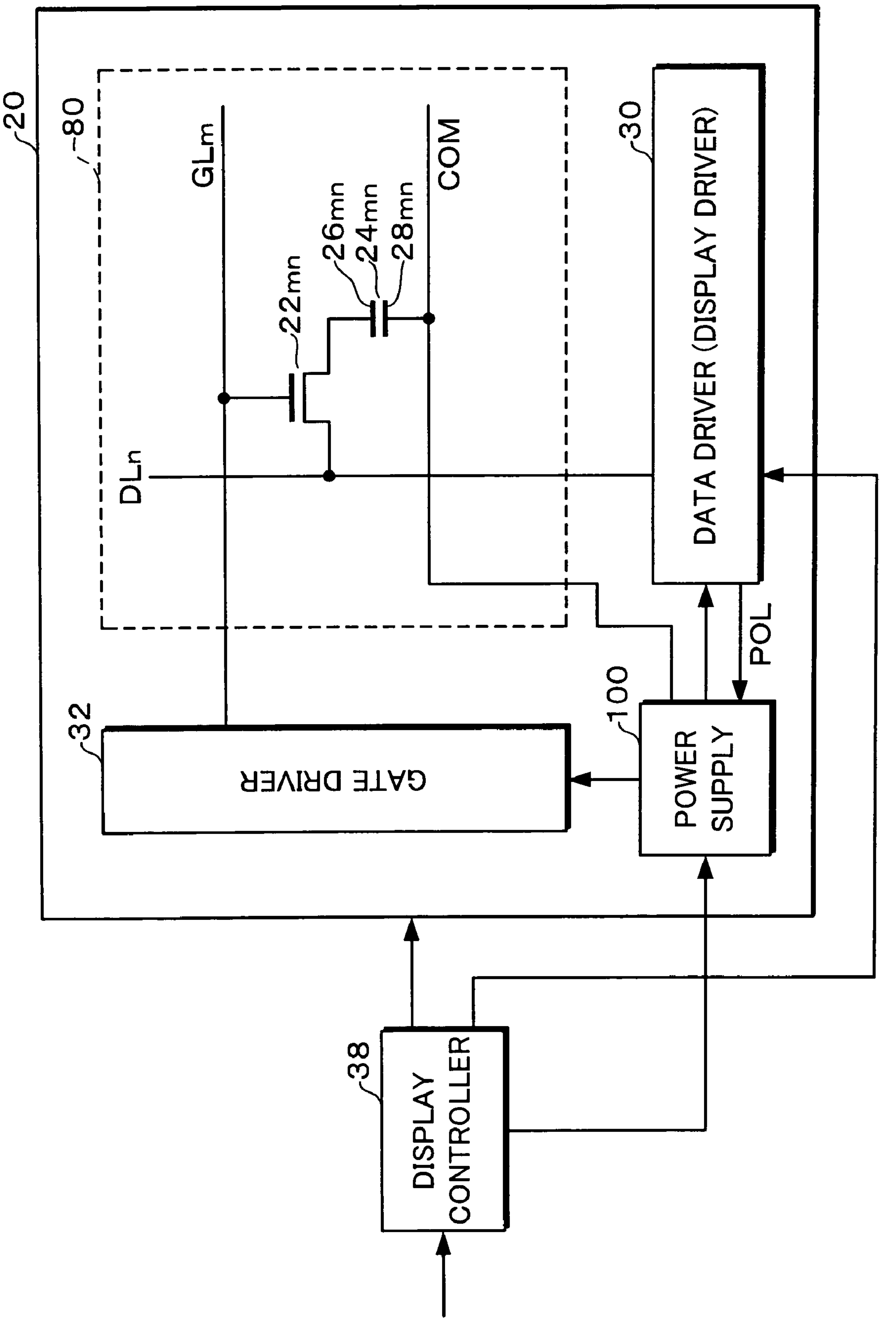
FIG. 2 is a block diagram showing another configuration example of the liquid crystal display device shown in FIG. 1.

Some or all of the data driver 30, the gate driver 32, the display controller 38, and the power supply circuit 100 may be formed on the glass substrate on which the LCD panel 20 is formed. In FIG. 2, the data driver 30, the gate driver 32, and the power supply circuit 100 are formed on the LCD panel 20. Accordingly, the LCD panel 20 may be configured to include a plurality of scan lines, a plurality of data lines, a pixel electrode specified by one of the scan lines and one of the data lines, a common electrode opposite to the pixel electrode through an electro-optical substance, a scan driver which scans the scan lines, a data driver which drives the data lines, and a power supply circuit which supplies a common electrode voltage to the common electrode. A plurality of pixels are formed in a pixel formation region 80 of the LCD panel 20.

1.1 Polarity Inversion Drive Method

When driving a liquid crystal, an electric charge stored in the liquid crystal capacitor must be periodically discharged from the viewpoint of durability of the liquid crystal and contrast. In the liquid crystal display device 10, the polarity of the voltage applied to the liquid crystal is reversed in a given cycle by using a polarity inversion drive. The polarity inversion drive method is divided into a field inversion drive and a line inversion drive depending on the type of polarity inversion cycle, for example.

The field inversion drive utilizes a method in which the polarity of the voltage applied to the liquid crystal is reversed in field units (in units of one vertical scan period). The line inversion drive utilizes a method in which the polarity of the voltage applied to the liquid crystal is reversed in line units (in units of one or more horizontal scan periods). In the line inversion drive, the polarity of the voltage applied to the liquid crystal is reversed in a frame cycle in each line.

Figure 3A:
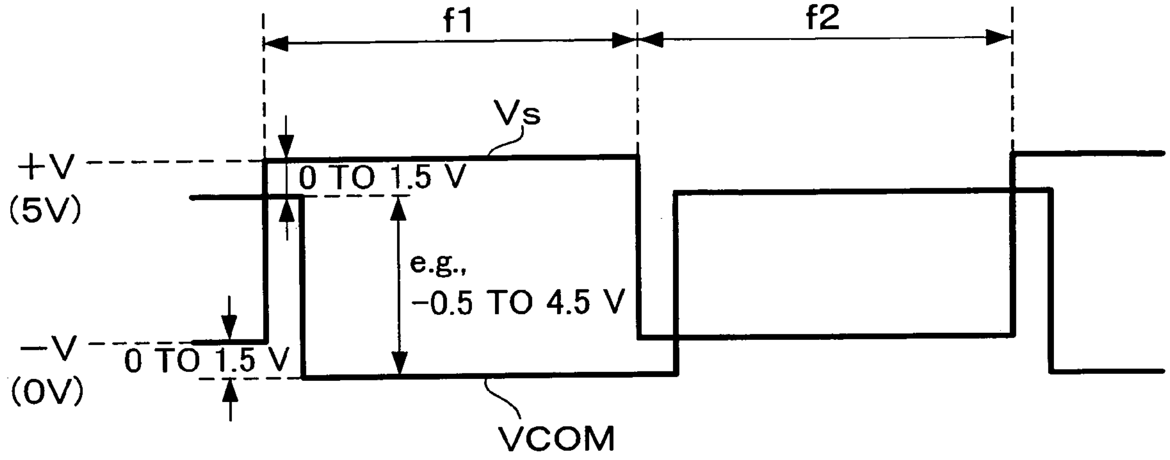
FIGS. 3A and 3B are diagrams illustrative of a polarity inversion drive.
Figure 3B:
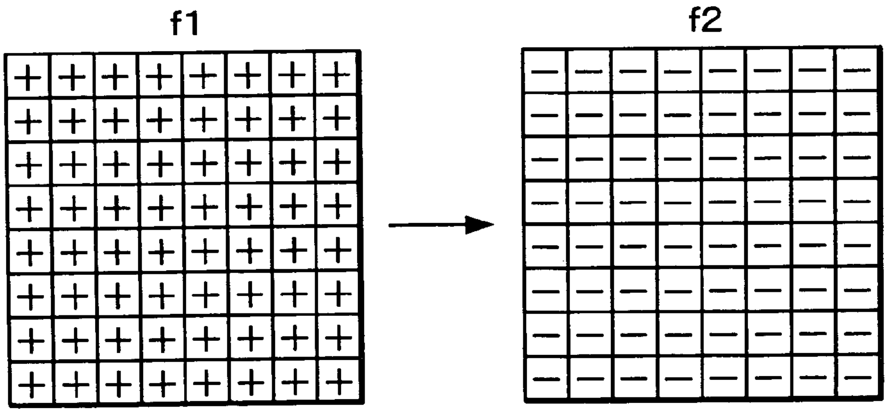

FIGS. 3A and 3B are diagrams illustrative of the operation of the field inversion drive. FIG. 3A schematically shows waveforms of the voltage supplied to the data line and the common electrode voltage VCOM in the field inversion drive. FIG. 3B schematically shows the polarity of the voltage applied to the liquid crystal corresponding to each pixel in units of one vertical scan period when performing the field inversion drive.

In the field inversion drive, the polarity of the voltage supplied to the data line is reversed in units of one vertical scan period, as shown in FIG. 3A. Specifically, a voltage Vs supplied to the source of the TFT connected with the data line is set at "+V" in a frame f1 and is set at "−V" in the subsequent frame f2. The polarity of the common electrode voltage VCOM supplied to the common electrode opposite to the pixel electrode connected with the drain electrode of the TFT is also reversed in synchronization with the polarity inversion timing of the voltage supplied to the data line.

Since the difference in voltage between the pixel electrode and the common electrode is applied to the liquid crystal, the polarity of the voltage is reversed in the frame f1 and the frame f2, as shown in FIG. 3B.

Figure 4A:
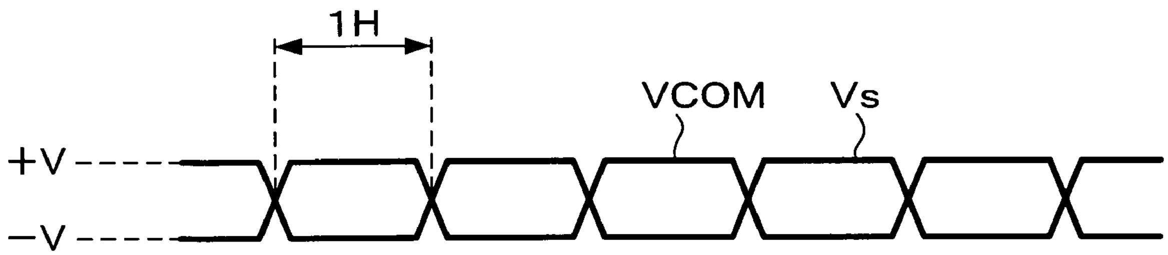
FIGS. 4A and 4B are diagrams illustrative of a polarity inversion drive.
Figure 4B:
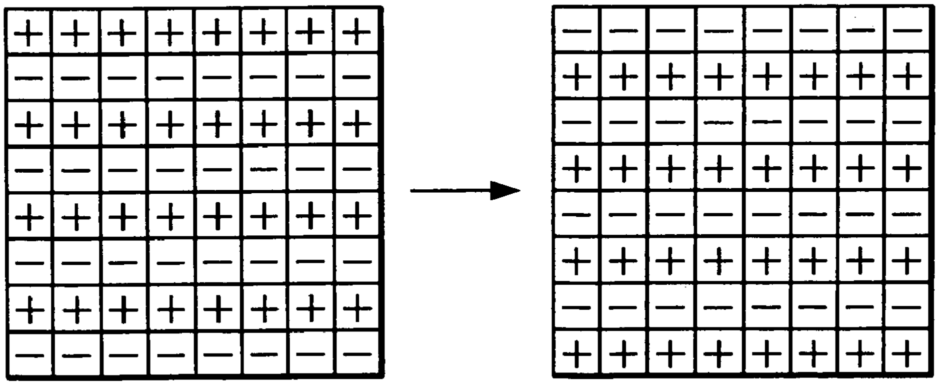

FIGS. 4A and 4B are diagrams illustrative of the operation of the line inversion drive. FIG. 4A schematically shows waveforms of the voltage supplied to the data line and the common electrode voltage VCOM in the line inversion drive. FIG. 4B schematically shows the polarity of the voltage applied to the liquid crystal corresponding to each pixel in units of one vertical scan period when performing the line inversion drive.

In the line inversion drive, the polarity of the voltage supplied to the data line is reversed in units of one horizontal scan period (1H) and in units of one vertical scan period, as shown in FIG. 4A. Specifically, the voltage Vs supplied to the source of the TFT connected with the data line is set at "+V" in 1H (one horizontal scan period) in the frame f1 and is set at "−V" in the next 1H.

In FIGS. 3A and 4A, the voltage applied to the liquid crystal is reversed by a common inversion drive which changes the voltage level of the common electrode voltage VCOM.

Figure 5:
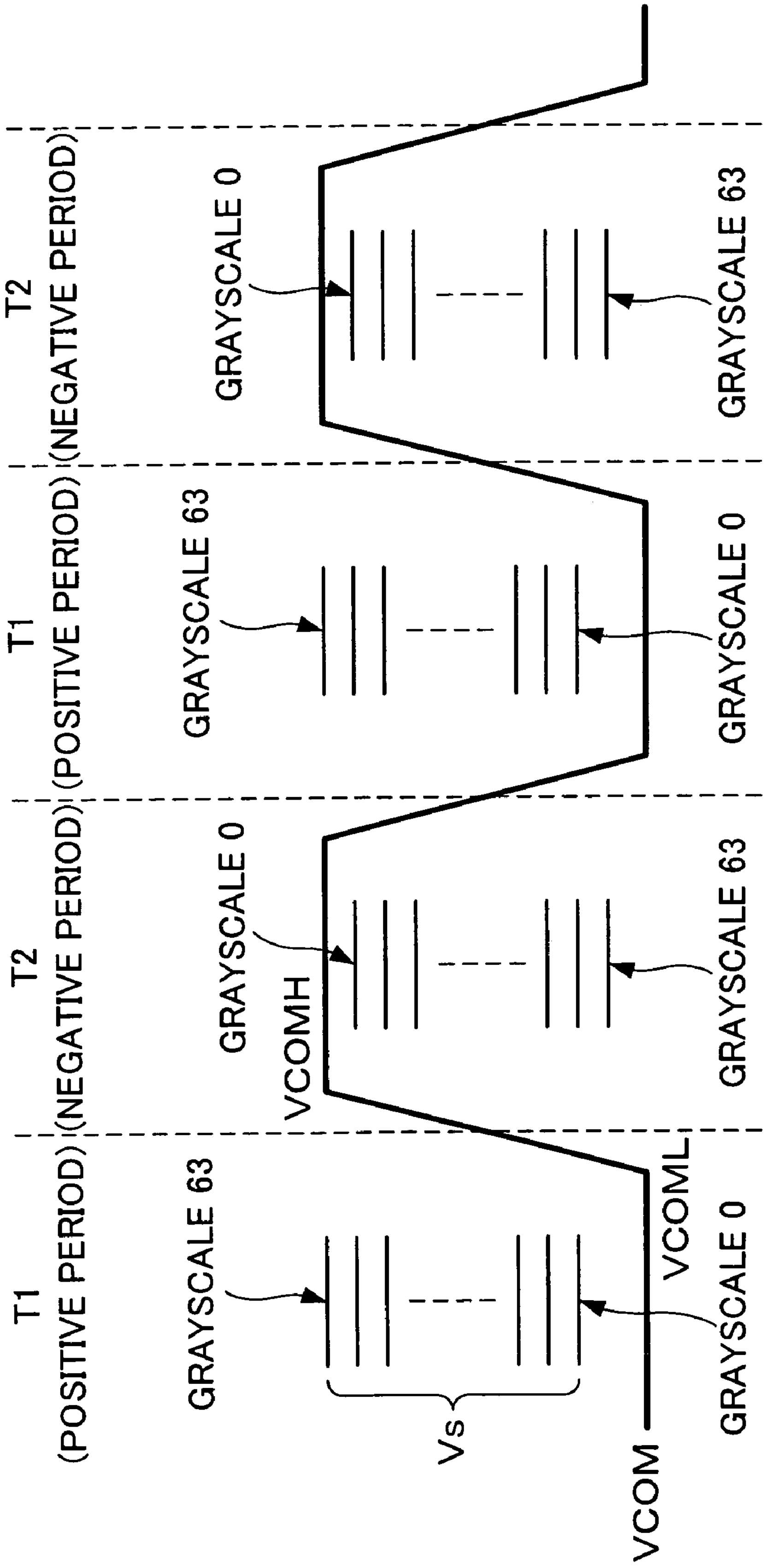
FIG. 5 is a diagram illustrative of the case of combining a line inversion drive and a common inversion drive.

FIG. 5 is a detailed diagram illustrative of the case of combining the line inversion drive and the common inversion drive.

In FIG. 5, a positive voltage is applied to the liquid crystal element in the mth scan period (select period of the scan line GLm), a negative voltage is applied to the liquid crystal element in the (m+1)th scan period, and a positive voltage is applied to the liquid crystal element in the (m+2)th scan period, for example. In the next frame, a negative voltage is applied to the liquid crystal element in the mth scan period, a positive voltage is applied to the liquid crystal element in the (m+1)th scan period, and a negative voltage is applied to the liquid crystal element in the (m+2)th scan period. In the line inversion drive, the polarity of the voltage (common voltage) VCOM of the common electrode COM is reversed in scan period units.

In more detail, the common electrode voltage VCOM is set at the high-potential-side voltage VCOMH in a positive period T1 (first period) and is set at the low-potential-side voltage VCOML in a negative period T2 (second period).

The positive period T1 is a period in which the voltage Vs of the data line (pixel electrode) is higher than the common electrode voltage VCOM. In the period T1, a positive voltage is applied to the liquid crystal element. The negative period T2 is a period in which the voltage Vs of the data line is lower than the common electrode voltage VCOM. In the period T2, a negative voltage is applied to the liquid crystal element. The high-potential-side voltage VCOMH may be referred to as a voltage obtained by reversing the polarity of the low-potential-side voltage VCOML with respect to a given voltage.

The voltage necessary for driving the LCD panel can be decreased by reversing the polarity of the common electrode voltage VCOM in this manner. This allows the breakdown voltage of the driver circuit of the LCD panel to be reduced, whereby the manufacturing process of the driver circuit can be simplified and the manufacturing cost can be reduced.

2. Supply Capability Control

The capability of the power supply circuit to supply the common electrode voltage VCOM is determined depending on the load of the common electrode COM. Since the image quality deteriorates if the power supply capability of the power supply circuit is insufficient, the power supply capability is generally determined taking into consideration the maximum value of the amount of electric charge which must be charged into or discharged from the common electrode COM.

However, the voltage Vs of the data line changes depending on a grayscale value indicated by the grayscale data. Since the grayscale value differs in scan line units, the voltage Vs of the data line also differs in scan line units. Since the pixel electrode and the common electrode are capacitively coupled as described above, the supply capability of the common electrode voltage VCOM is unnecessary depending on the voltage applied to the pixel electrode or the amount of change (change) in the applied voltage.

Figure 6A:
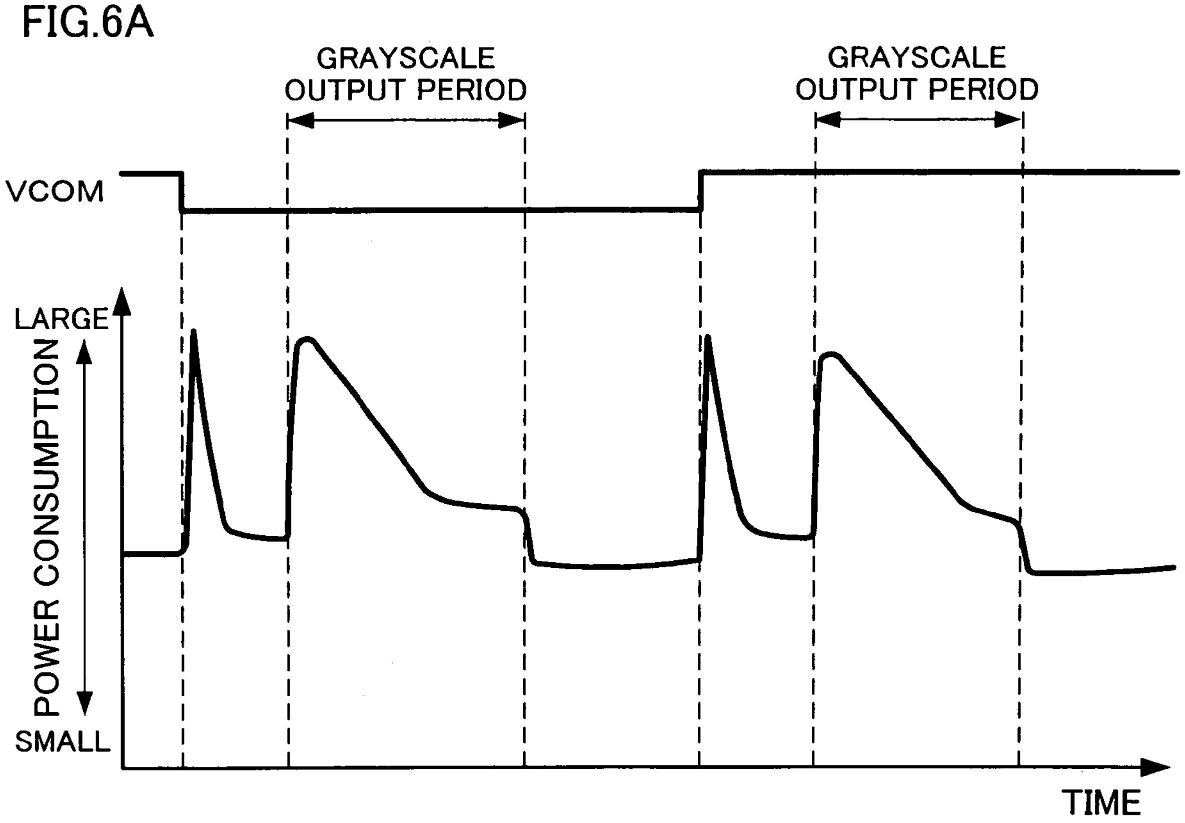
FIGS. 6A and 6B are diagrams illustrative of the difference in power consumption depending on grayscale data.
Figure 6B:
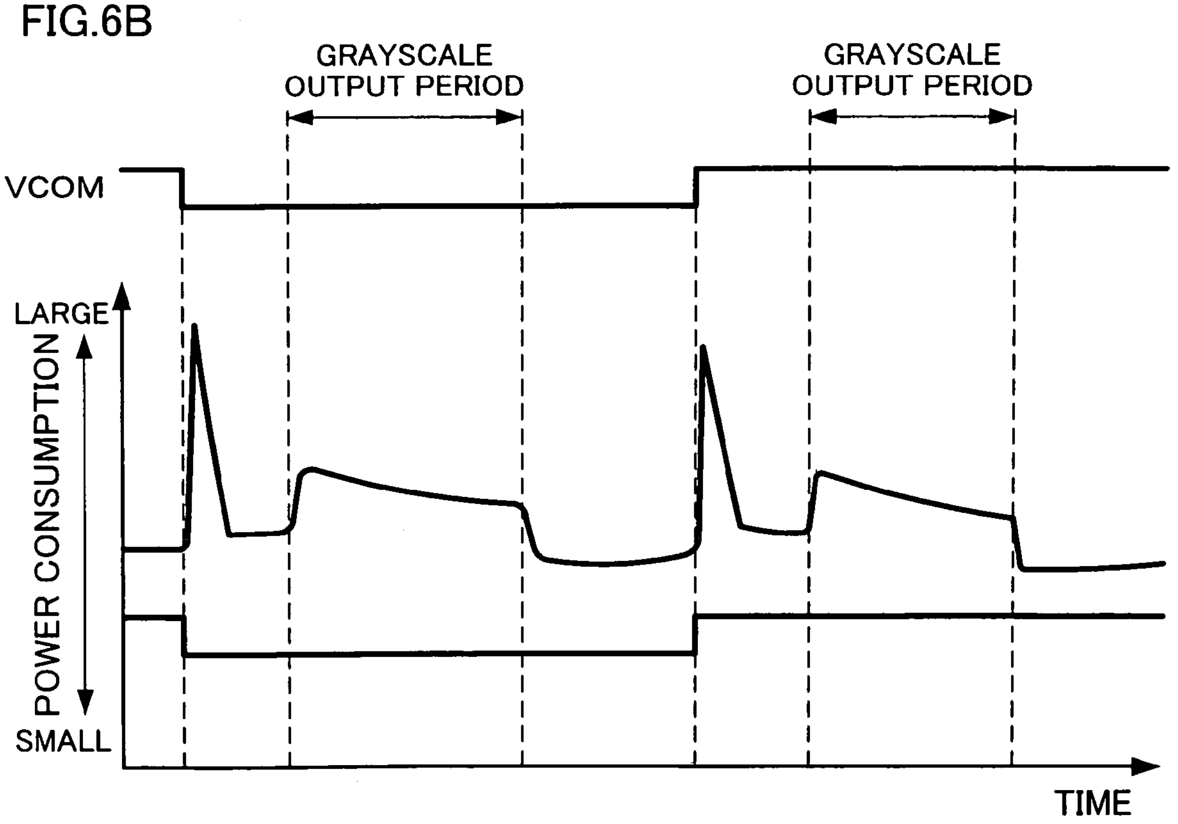

FIGS. 6A and 6B schematically show a change in power consumption of the power supply circuit which supplies the common electrode voltage VCOM.

FIGS. 6A and 6B show the case where the polarity inversion drive is performed by using the line inversion drive in a general normally-white active matrix type LCD panel. FIG. 6A shows a change in power consumption when performing a black display. FIG. 6B shows a change in power consumption when performing a white display.

In a voltage change period in which the voltage level of the common electrode voltage VCOM changes, since the power supply circuit must change the voltage level of the common electrode COM from the high-potential-side voltage VCOMH to the low-potential-side voltage VCOML, a high supply capability is necessary. In the next voltage change period, since the power supply circuit must change the voltage level of the common electrode COM from the low-potential-side voltage VCOML to the high-potential-side voltage VCOMH, a high supply capability is also necessary. A large amount of power is consumed in the voltage change periods.

In a grayscale output period in which voltage is supplied to the data line after the voltage level of the common electrode COM has changed, voltage corresponding to the grayscale value in the horizontal scan period is supplied to the pixel electrode. In this case, an electric charge must be supplied to or removed from the common electrode COM capacitively coupled with the pixel electrode so that the change in the voltage applied to the pixel electrode is eliminated.

However, the voltage applied to the pixel electrode must be increased in the black display shown in FIG. 6A in comparison with the white display shown in FIG. 6B. This is because it is necessary to increase the difference between the common electrode voltage VCOM and the voltage applied to the pixel electrode in FIG. 6A in comparison with FIG. 6B.

Therefore, power consumption is increased in FIG. 6A in comparison with FIG. 6B. Specifically, power consumption of the power supply circuit which drives the common electrode COM differs depending on the grayscale value in the horizontal scan period.

However, the power supply capability of a general power supply circuit is determined taking into consideration the maximum value of the amount of electric charge which must be charged into or discharged from the common electrode COM as shown in FIG. 6A. Therefore, unnecessary power consumption occurs in FIG. 6B even though a high power supply capability is not necessary for the power supply circuit.

Therefore, the power supply circuit according to one embodiment of the invention is configured so that the supply capability of the common electrode voltage VCOM can be controlled. This enables the circuit scale and power consumption of the power supply circuit to be reduced without causing deterioration of the image quality of the LCD panel.

Figure 7:
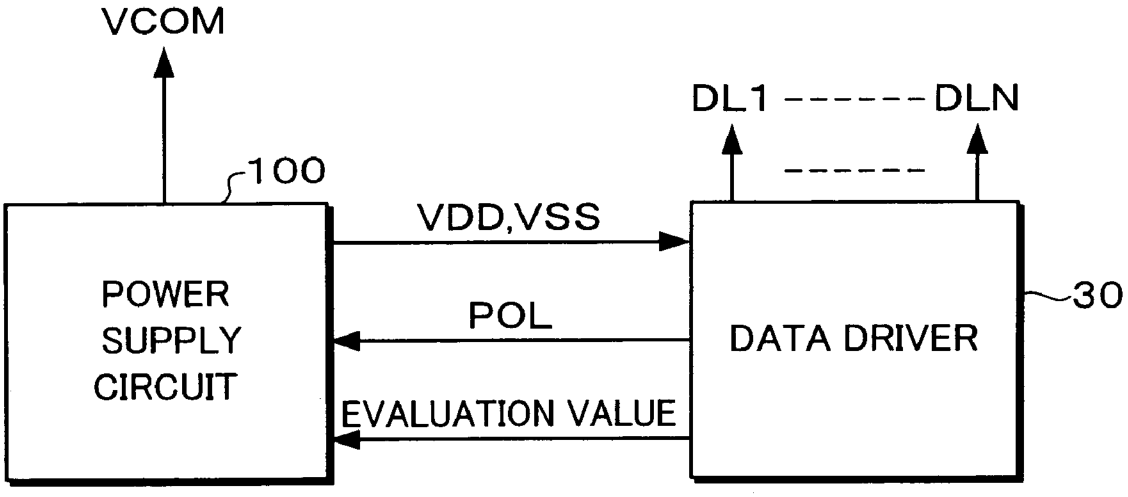
FIG. 7 shows a configuration example of a power supply capability control system including a power supply circuit according to one embodiment of the invention.

FIG. 7 shows a configuration example of a power supply capability control system including the power supply circuit according to one embodiment of the invention.

In FIG. 7, sections the same as the sections shown in FIG. 1 or 2 are indicated by the same symbols. Description of these sections is appropriately omitted. In the power supply capability control system, the power supply circuit 100 supplies the power supply voltages VDD and VSS of the data driver 30, for example. The power supply circuit 100 reverses the polarity of the common electrode voltage VCOM in synchronization with the polarity inversion signal POL from the data driver 30. The power supply circuit 100 receives an evaluation value from the data driver 30, and changes the supply capability of the common electrode voltage VCOM based on the evaluation value.

As the evaluation value, the grayscale data (line data) for one scan line in the horizontal scan period or a value (line value) calculated based on the grayscale data for one scan line may be used. For example, the amount of electric charge which must be charged into or discharged from the common electrode is estimated based on the grayscale data for one scan line in the horizontal scan period, and the supply capability of the common electrode voltage VCOM is changed. Or, the amount of electric charge which must be charged into or discharged from the common electrode may be associated with a change in the voltage applied to the pixel electrode, and the amount of change between the grayscale data for one scan line in the present horizontal scan period and the grayscale data for one scan line in the horizontal scan period immediately before the present horizontal scan period may be used as the evaluation value. A value (line value) calculated by the line data including a part of the grayscale data for the number of dots of one scan line may be used as the evaluation value instead of the grayscale data for the number of dots of one scan line.

The data driver 30 and the power supply circuit 100 which realize such control are described below.

2.1 Data Driver

Figure 8:
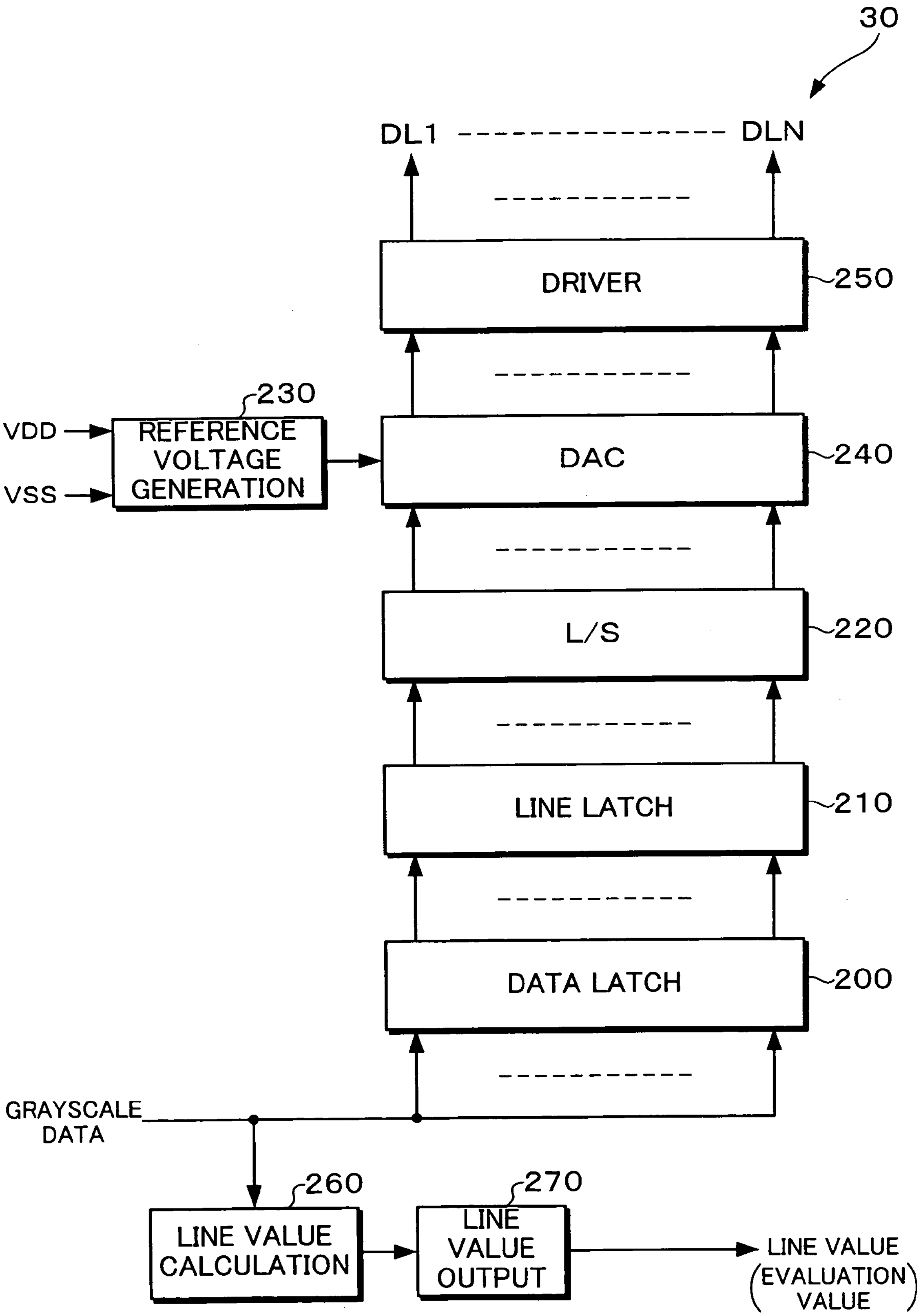
FIG. 8 is a block diagram showing a configuration example of a data driver according to one embodiment of the invention.

FIG. 8 is a block diagram showing a configuration example of the data driver 30 shown in FIG. 1.

The data driver 30 includes a data latch 200, a line latch 210, a level shifter (L/S) 220, a reference voltage generation circuit 230, a digital/analog converter (DAC) (voltage select circuit in a broad sense) 240, and a driver circuit 250.

The data latch 200 includes a plurality of flip-flops connected in series, the flip-flops being provided corresponding to output lines of the data driver 30. The grayscale data is input to each flip-flop, and voltage corresponding to the grayscale data is supplied to each output line. The grayscale data is serially input from the display controller 38 in pixel units (or dot units) in synchronization with a dot clock signal DCK. The data latch 200 acquires the grayscale data for one horizontal scan by shifting the grayscale data in synchronization with the dot clock signal DCK, for example. The dot clock signal DCK is supplied from the display controller 38. When signals for one pixel include a 6-bit R signal, a 6-bit G signal, and a 6-bit B signal, one pixel (=three dots) is made up of 18 bits.

The line latch 210 includes a plurality of flip-flops provided corresponding to the output lines. The line latch 210 latches the grayscale data input to the data latch 200 at the change timing of a horizontal synchronization signal HSYNC.

The L/S 220 includes a plurality of level conversion circuits provided corresponding to the output lines. The level conversion circuit converts the voltage level so that the signal of the grayscale data, which oscillates at a logic voltage of 1.8 V, oscillates at a voltage of 5 V, for example.

The reference voltage generation circuit 230 generates a plurality of reference voltages, each of which corresponds to the grayscale value indicated by the grayscale data. In more detail, the reference voltage generation circuit 230 generates reference voltages V0 to V63, each of which corresponds to 6-bit. grayscale data, based on the high-potential-side power supply voltage VDD and the low-potential-side power supply voltage VSS. The high-potential-side power supply voltage VDD and the low-potential-side power supply voltage VSS are generated by the power supply circuit 100, for example.

The DAC 240 includes a plurality of ROM decoder circuits provided corresponding to the output lines. The ROM decoder circuit selects one of the reference voltages V0 to V63 from the reference voltage generation circuit 230 based on the signal of the grayscale data of which the voltage level is converted by the level conversion circuit of the L/S 220. This enables the DAC 240 to generate a data voltage corresponding to the grayscale data in output line units.

The driver circuit 250 drives a plurality of output lines, each of which is connected with the data line of the LCD panel 20. In more detail, the driver circuit 250 includes a plurality of impedance conversion circuits provided corresponding to the output lines. The impedance conversion circuit drives the output line based on the data voltage generated by the DAC 240 in output line units. The impedance conversion circuit is formed by a voltage-follower-connected operational amplifier.

In the data driver 30 having the above-described configuration, the grayscale data for one horizontal scan input to the data latch 200 is latched by the line latch 210, for example. The data voltage is generated in output line units by using the grayscale data latched by the line latch 210. The driver circuit 250 drives each output line based on the data voltage generated by the DAC 240.

Figure 9:
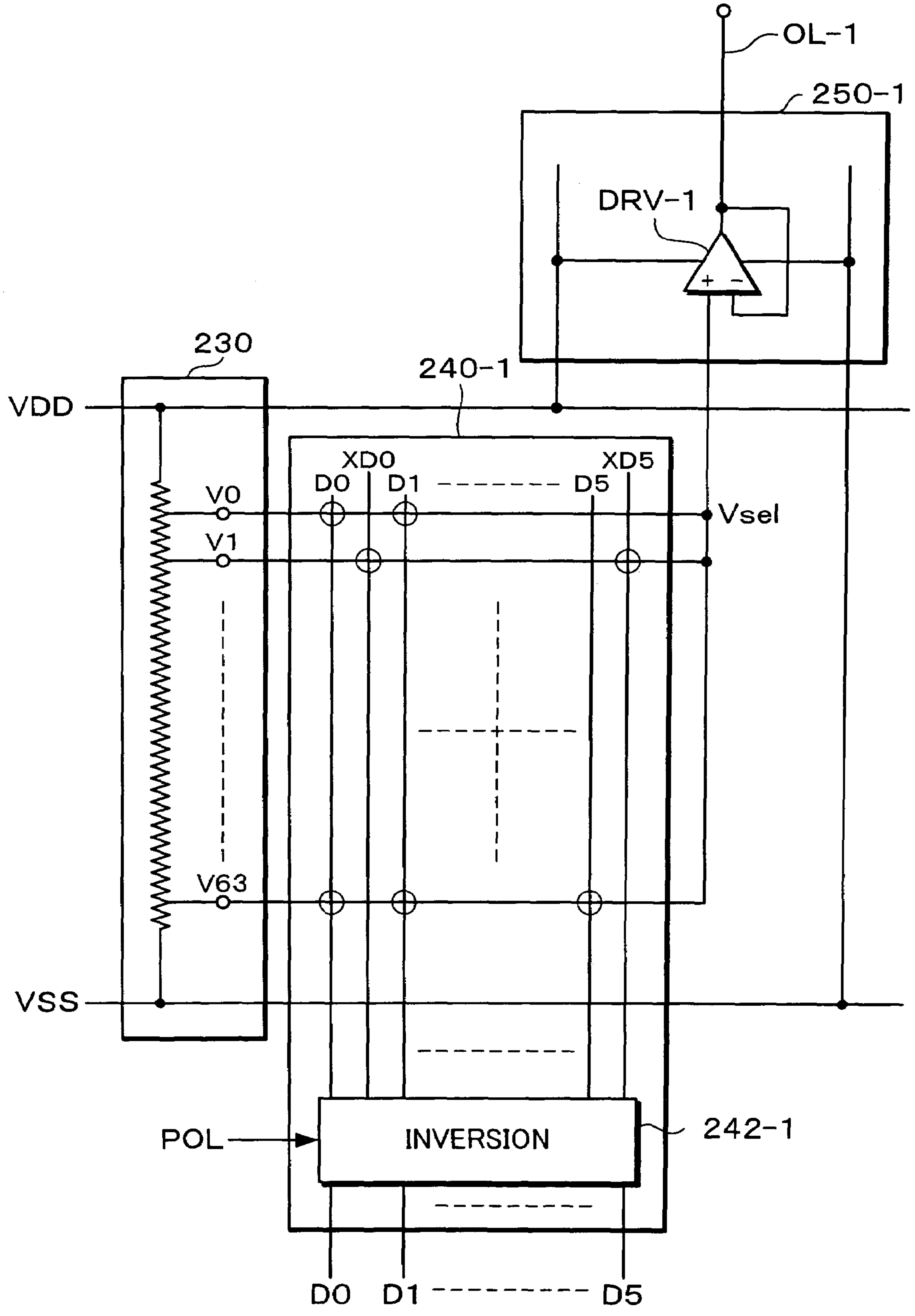
FIG. 9 is a diagram illustrative of the operation of the major portion of the data driver shown in FIG. 8.

FIG. 9 shows an outline of a configuration of the reference voltage generation circuit 230, the DAC 240, and the driver circuit 250. FIG. 9 shows only the configuration corresponding to one output line of the driver circuit 250. However, the same description also applies to other output lines. FIG. 9 shows only the configuration of a driver circuit 250-1 of the driver circuit 250 which drives a data line DL1.

In the reference voltage generation circuit 230, a resistor circuit is connected between the high-potential-side power supply voltage VDD and the low-potential-side power supply voltage VSS. The reference voltage generation circuit 230 generates a plurality of divided voltages obtained by dividing the voltage between the power supply voltages VDD and VSS by using the resistor circuit as the reference voltages V0 to V63. In the polarity inversion drive, since the positive voltage and the negative voltage are not symmetrical in the actual situation, positive reference voltages and negative reference voltages are generated. FIG. 9 shows one of them.

A DAC 240-1 may be realized by a ROM decoder circuit. The DAC 240-1 selects one of the reference voltages V0 to V63 based on the 6-bit grayscale data, and outputs the selected reference voltage to an impedance conversion circuit DRV-1 as a select voltage Vsel. A voltage selected based on the corresponding 6-bit grayscale data is also output to each of the remaining impedance conversion circuits DRV-2 to DRV-N.

The DAC 240-1 includes an inversion circuit 242-1. The inversion circuit 242-1 reverses each bit of the grayscale data based on the polarity inversion signal POL. 6-bit grayscale data D0 to D5 and 6-bit drive inversion grayscale data XD0 to XD5 are input to the ROM decoder circuit. The drive inversion grayscale data XD0 to XD5 is obtained by reversing the logic of the grayscale data D0 to D5, respectively. The ROM decoder circuit selects one of the multi-valued reference voltages V0 to V63 generated by the reference voltage generation circuit 230 based on the grayscale data D0 to D5 and the drive inversion grayscale data XD0 to XD5.

For example, when the polarity inversion signal POL is set at the H level, the reference voltage V2 is selected corresponding to the 6-bit grayscale data D0 to D5 “000010” (=2). When the polarity inversion signal POL is set at the L level, the reference voltage is selected by using the drive inversion grayscale data XD0 to XD5 obtained by reversing the grayscale data D0 to D5. Specifically, the drive inversion grayscale data XD0 to XD5 is “111101” (=61) so that the reference voltage V61 is selected.

The select voltage Vsel selected by the DAC 240-1 is supplied to the impedance conversion circuit DRV-1. The impedance conversion circuit DRV-1 drives the output line OL-1 based on the select voltage Vsel. The power supply circuit 100 changes the common electrode voltage VCOM in synchronization with the polarity inversion signal POL as described above. The polarity of the voltage applied to the liquid crystal is reversed in this manner.

The data driver 30 shown in FIG. 8 may include a line value calculation circuit 260 and a line value output section 270. The line value calculation circuit 260 generates a line value as the evaluation value supplied to the power supply circuit 100 based on the grayscale data from the display controller 38. The line value output section 270 includes a buffer. The line value output section 270 adjusts the output timing of the line value generated by the line value calculation circuit 260, and supplies the line value of which the output timing has been adjusted to the power supply circuit 100. By adjusting the output timing the common electrode voltage VCOM of the power supply circuit 100 can be changed while associating the common electrode voltage VCOM with the grayscale data (line data) for one scan line corresponding to the voltage applied to the pixel electrode.

FIG. 8 shows the case where the data driver 30 and the power supply circuit 100 are independently provided. However, the data driver 30 shown in FIG. 8 may include the power supply circuit 100.

2.2 Evaluation Method

In one embodiment of the invention, the common electrode voltage VCOM of the power supply circuit 100 is changed while associating the common electrode voltage VCOM with the grayscale data (line data) for one scan line corresponding to the voltage applied to the pixel electrode. The common electrode voltage VCOM of the power supply circuit 100 may be changed while associating the common electrode voltage VCOM with the amount of change in the grayscale data (line data) for one scan line corresponding to the amount of change in the voltage applied to the pixel electrode.

In one embodiment of the invention described below, the line value calculation circuit 260 shown in FIG. 8 converts the line data into the line value as the evaluation value. The power supply circuit 100 estimates (evaluates) the voltage applied to the pixel electrode or the amount of change in the applied voltage based on the line value, and changes the supply capability of the common electrode voltage VCOM based on the estimation result (evaluation result). This prevents unnecessary current consumption of the power supply circuit 100. This also applies to the case of changing the supply capability of the common electrode voltage VCOM based on the line data, the amount of change in the line data, or the amount of change in the line value.

Figure 10:
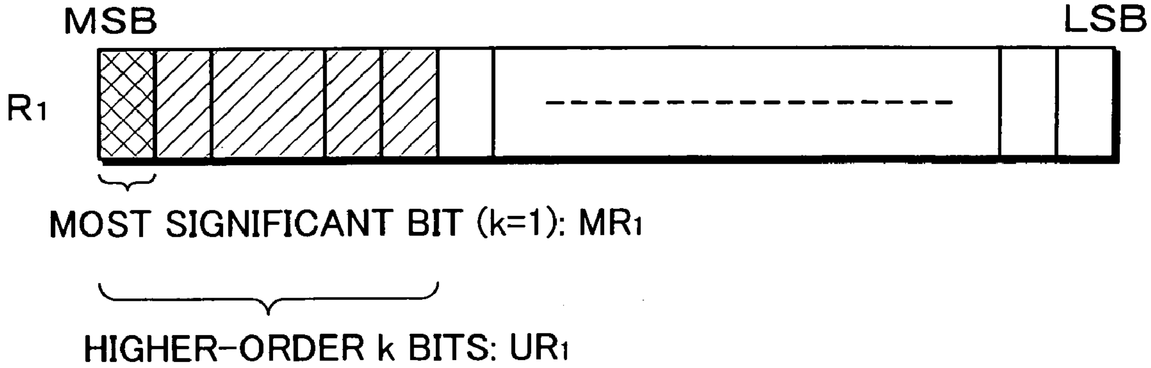
FIG. 10 is a diagram showing a configuration example of grayscale data per dot.

FIG. 10 shows a configuration example of grayscale data per dot.

FIG. 10 shows a configuration example of the grayscale data corresponding to the voltage supplied to the data line DL1 (output line OL-1). A voltage corresponding to grayscale data $R_1$ of the R component making up one pixel is supplied to the data line DL1.

In this example, the grayscale data $R_1$ is made up of j (j is an integer greater than one) bits. In this case, higher-order k-bit (k<j, k is a natural number) data of the grayscale data $R_1$ includes the most significant bit (MSB) of the grayscale data $R_1$ and is higher-order k-bit data $UR_1$ from the MSB side. When k is “1”, the most significant bit of the converted voltage value data CR1 is data $MR_1$ shown in FIG. 10.

Figure 11:
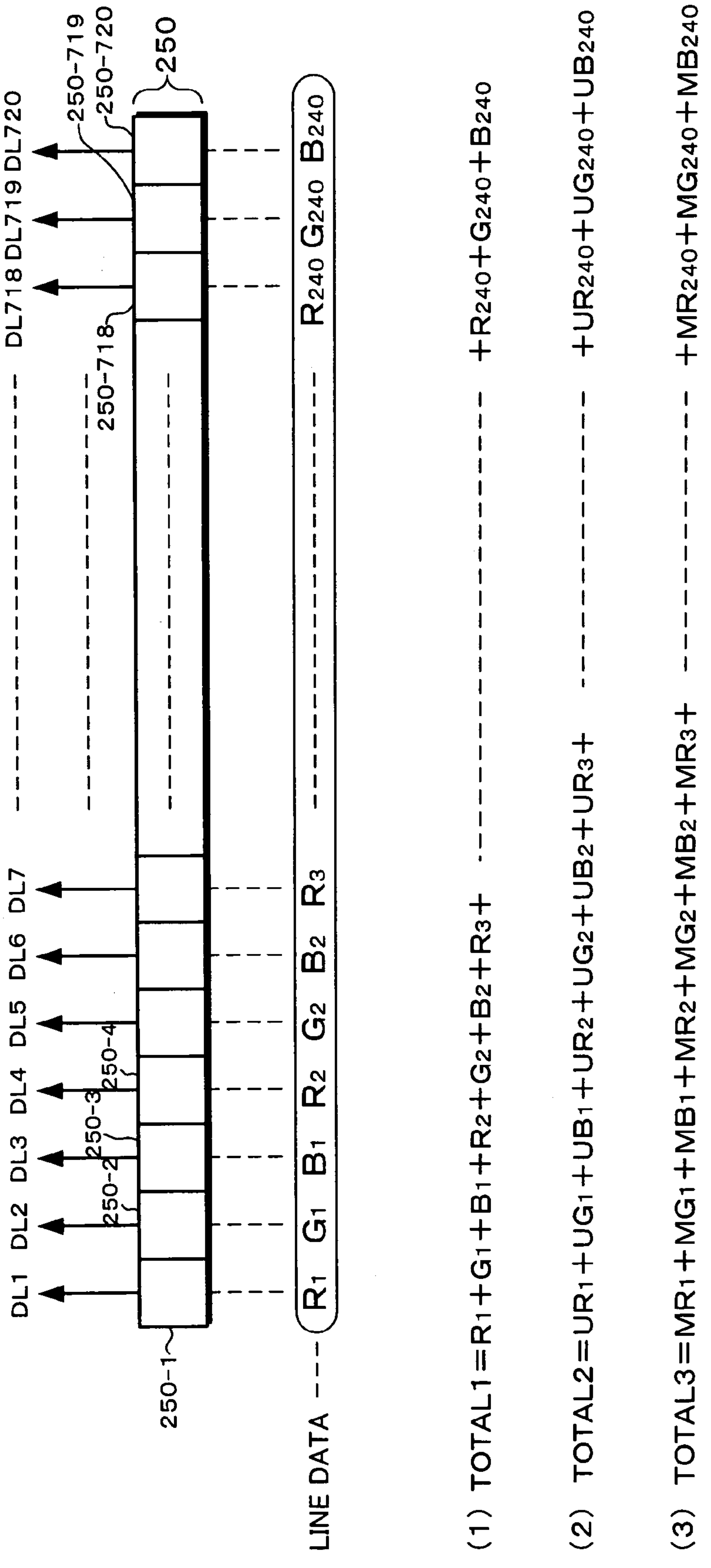
FIG. 11 is a diagram illustrative of an example of calculation processing of a line value calculation circuit shown in FIG. 8.

FIG. 11 is a diagram illustrative of an example of calculation processing of the line value calculation circuit 260 shown in FIG. 8.

In FIG. 11, one pixel is formed by three dots, and the number of pixels for one scan line is 240 (=720 dots).

In one embodiment of the invention, the driver circuit 250-1 drives the data line DL1 based on grayscale data $R_1$ of the R component making up one pixel. The driver circuit 250-2 drives the data line DL2 based on grayscale data $G_1$ of the G component making up one pixel. The driver circuit 250-3 drives the data line DL3 based on grayscale data $B_1$ of the B component making up one pixel. The grayscale data for a pixel $P_1$ is made up of the grayscale data $R_1$, $G_1$, and $B_1$.

Likewise, the driver circuit 250-4 drives the data line DL4 based on grayscale data $R_2$ of the R component making up one pixel. The driver circuit 250-5 drives the data line DL5 based on the grayscale data $G_2$ of the G component making up one pixel. The driver circuit 250-6 drives the data line DL6 based on the grayscale data $B_2$ of the B component making up one pixel. The grayscale data for a pixel $P_2$ is made up of the grayscale data $R_2$, $G_2$, and $B_2$.

Likewise, the driver circuit 250-718 drives the data line DL718 based on grayscale data $R_{240}$ of the R component making up one pixel. The driver circuit 250-719 drives the data line DL719 based on the grayscale data $G_{240}$ of the G component making up one pixel. The driver circuit 250-720 drives the data line DL720 based on grayscale data $B_{240}$ of the B component making up one pixel. The grayscale data for a pixel $P_{240}$ is made up of the grayscale data $R_{240}$, $G_{240}$, and $B_{240}$.

For example, the line value calculation circuit 260 calculates a total value TOTAL1, which is obtained by sequentially adding the grayscale data for the number of dots (=720) of one scan line as the line value. For example, the line value calculation circuit 260 includes an adder and a register. The line value calculation circuit 260 sequentially adds serially input grayscale data, stores the result in the register, and adds the value stored in the register and the subsequent grayscale data. The line value calculation circuit 260 repeatedly performs this operation. In this case, the total value TOTAL1 is shown by the following expression.

$$\mathrm{TOTAL1}=R_1+G_1+B_1+R_2+G_2+B_2+\ldots+R_{240}+G_{240}+B_{240} \quad (1)$$

The line value calculation circuit 260 may calculate a total value TOTAL2, which is obtained by sequentially adding higher-order k-bit data of each piece of grayscale data for the number of dots (=720) of one scan line as the line value. In this case, the total value TOTAL2 is shown by the following expression.

$$\mathrm{TOTAL2}=UR_1+UG_1+UB_1+UR_2+UG_2+UB_2+\ldots+UR_{240}+UG_{240}+UB_{240} \quad (2)$$

The line value calculation circuit 260 may calculate a total value TOTAL3, which is obtained by sequentially adding the most significant bit (k=1) data of each piece of grayscale data for the number of dots (=720) of one scan line as the line value. In this case, the total value TOTAL3 is shown by the following expression.

$$\mathrm{TOTAL3}=MR_1+MG_1+MB_1+MR_2+MG_2+MB_2+\ldots+MR_{240}+MG_{240}+MB_{240} \quad (3)$$

The total values TOTAL1, TOTAL2, and TOTAL3 may be associated with the sum total of the voltages applied to the pixel electrode for one scan line, and may be used as material for determining whether or not it is necessary to increase the supply capability of the common electrode voltage VCOM or whether or not the voltage level is not changed even if the supply capability is decreased.

As the total value, the grayscale data for some of the number of dots of one scan line, higher-order bits of the grayscale data, or a value obtained by sequentially adding the most significant bit may also be used.

FIG. 11 shows an example in which the line value calculation circuit 260 calculates the line value when the LCD panel 20 is normally black. When the LCD panel 20 is normally black, the voltage applied to the liquid crystal is increased as the value of the grayscale data of each dot is increased.

On the other hand, when the LCD panel 20 is normally white, the line value calculation circuit 260 may calculate the line value as follows.

Figure 12:
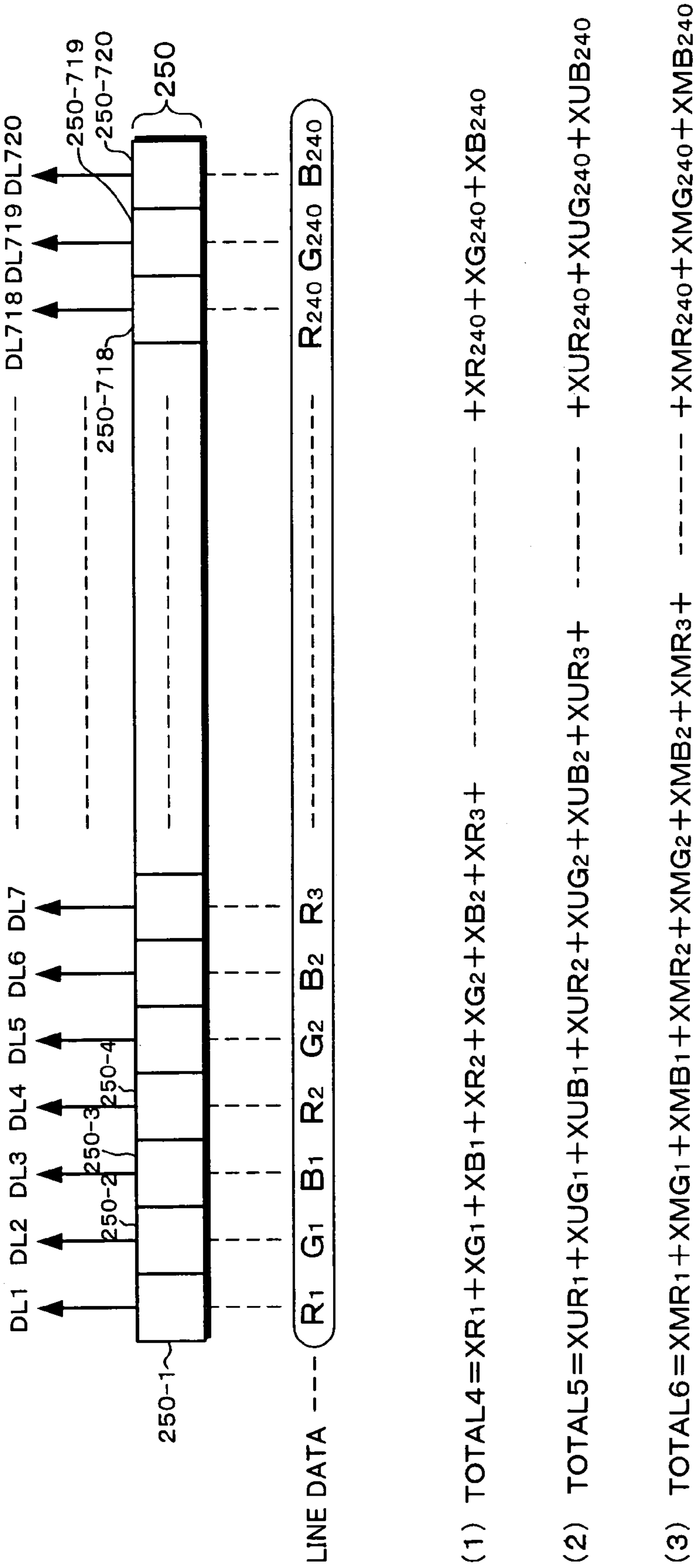
FIG. 12 is a diagram illustrative of another example of the calculation processing of the line value calculation circuit shown in FIG. 8.

FIG. 12 is a diagram showing another example of the calculation processing of the line value calculation circuit 260 shown in FIG. 8.

While FIG. 11 shows a line value processing example when the LCD panel 20 is normally white, FIG. 12 shows a line value processing example when the LCD panel 20 is normally black. In FIG. 12, the one's complement or the two's complement of the grayscale data $R_1$ is indicated as inversion grayscale data XR1, for example.

When the LCD panel 20 is normally white, the voltage applied to the liquid crystal is decreased as the value of the grayscale data of each dot is increased. Therefore, it becomes necessary to increase the supply capability of the common electrode voltage along with an increase in the line value by sequentially adding the one's complement or the two's complement of the grayscale data when the line value calculation circuit 260 sequentially adds at least a part of the grayscale data of each dot. In this case, the line value may also referred to as the value obtained by sequentially adding the grayscale data of each dot.

For example, the line value calculation circuit 260 may calculate a total value TOTAL4, which is obtained by sequentially adding the grayscale data for the number of dots (=720) of one scan line, as the line value. In this case, the total value TOTAL4 is shown by the following expression.

$$\mathrm{TOTAL4}=XR_1+XG_1+XB_1+XR_2+XG_2+XB_2+\ldots+XR_{240}+XG_{240}+XB_{240} \quad (4)$$

The line value calculation circuit 260 may calculate a total value TOTAL5, which is obtained by sequentially adding higher-order k-bit data of each piece of grayscale data for the number of dots (=720) of one scan line, as the line value. In this case, the one's complement or the two's complement of data of higher-order k bits of the grayscale data R1 is indicated as inversion grayscale data XUR1, and the total value TOTAL5 is shown by the following expression.

$$\mathrm{TOTAL5}=XUR_1+XUG_1+XUB_1+XUR_2+XUG_2+XUB_2+\ldots+XUR_{240}+XUG_{240}+XUB_{240} \quad (5)$$

The line value calculation circuit 260 may calculate a total value TOTAL6, which is obtained by sequentially adding the most significant bit (k=1) data of each piece of grayscale data for the number of dots (=720) of one scan line, as the line value. In this case, the one's complement or the two's complement of the most significant bit of the grayscale data $R_1$ is indicated as inversion grayscale data XMR1, and the total value TOTAL6 is shown by the following expression.

$$\mathrm{TOTAL6}=XMR_1+XMG_1+XMB_1+XMR_2+XMG_2+XMB_2+\ldots+XMR_{240}+XMG_{240}+XMB_{240} \quad (6)$$

The total values TOTAL4, TOTAL5, and TOTAL6 may be associated with the sum total of the voltages applied to the pixel electrode for one scan line, and may be used as material for determining whether or not it is necessary to increase the supply capability of the common electrode voltage VCOM or whether or not the voltage level is not changed even if the supply capability is decreased.

2.3 Power Supply Circuit

Figure 13:
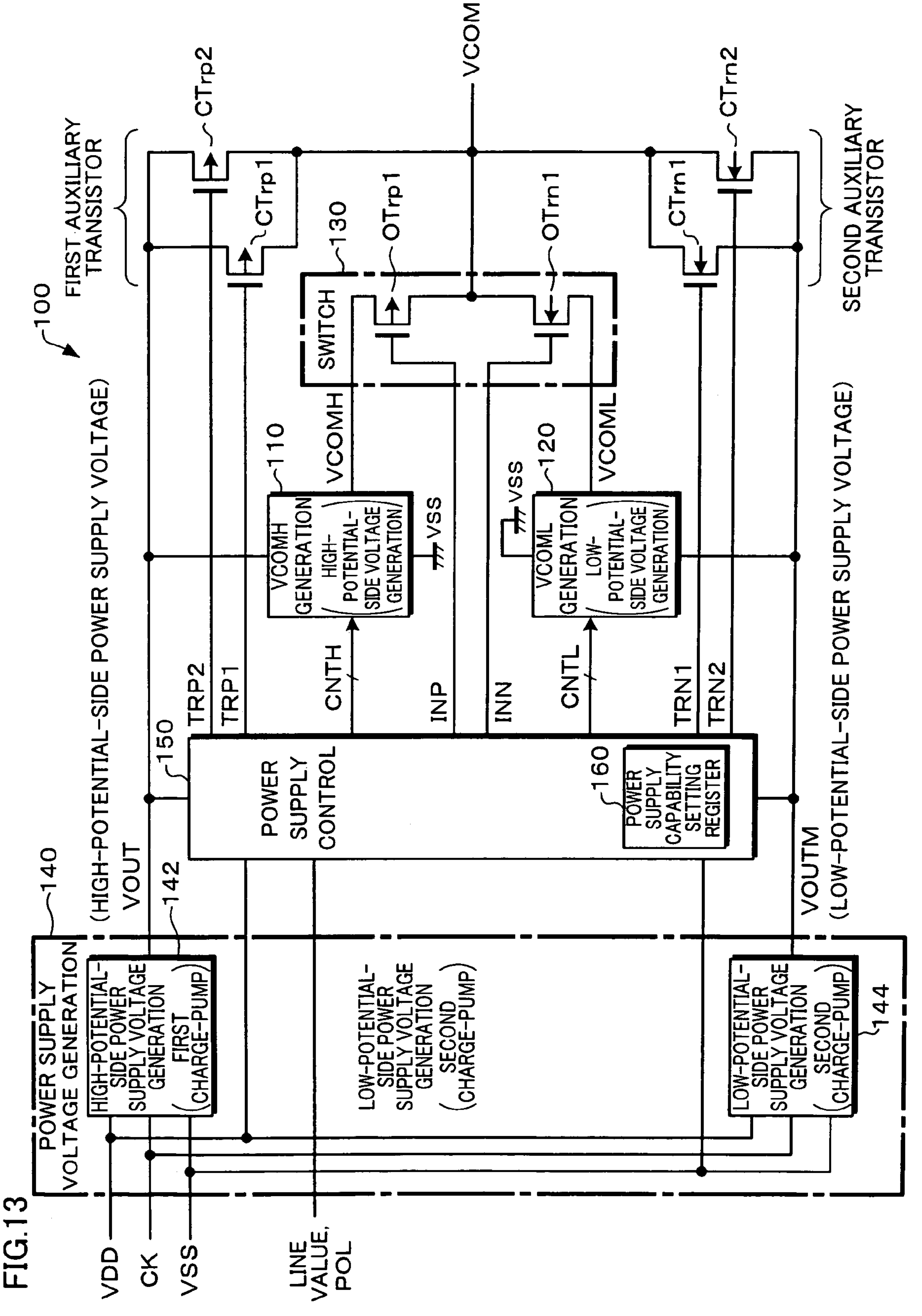
FIG. 13 is a block diagram showing a configuration example of the power supply circuit shown in FIG. 1.

FIG. 13 shows a configuration example of the power supply circuit 100 shown in FIG. 1.

The power supply circuit 100 supplies the common electrode voltage VCOM to a common electrode opposite to a pixel electrode through an electro-optical substance. The power supply circuit 100 includes a VCOMH generation circuit (high-potential-side voltage generation circuit) 110, a VCOML generation circuit (low-potential-side voltage generation circuit) 120, and a switch circuit 130. The VCOMH generation circuit 110 generates the high-potential-side voltage VCOMH of the common electrode voltage VCOM. The VCOML generation circuit 120 generates the low-potential-side voltage VCOML of the common electrode voltage VCOM. The switch circuit 130 alternately supplies one of the high-potential-side voltage VCOMH and the low-potential-side voltage VCOML to the common electrode COM as the common electrode voltage VCOM.

The switch circuit 130 may include a P-type (first conductivity type) output metal-oxide-semiconductor (MOS) transistor (MOS transistor is hereinafter abbreviated as "transistor") OTrp1 and an N-type output transistor OTrn1. The high-potential-side voltage VCOMH is supplied to the source of the output transistor OTrp1, and the drain of the output transistor OTrp1 is connected with the drain of the output transistor OTrn1. A gate signal INP is supplied to a gate of the output transistor OTrp1. The low-potential-side voltage VCOML is supplied to the source of the output transistor OTrn1. A gate signal INN is supplied to a gate of the output transistor OTrn1. The drain voltage of the output transistor OTrp1 (drain voltage of the output transistor OTrn1) is output as the common electrode voltage VCOM.

Figure 14:
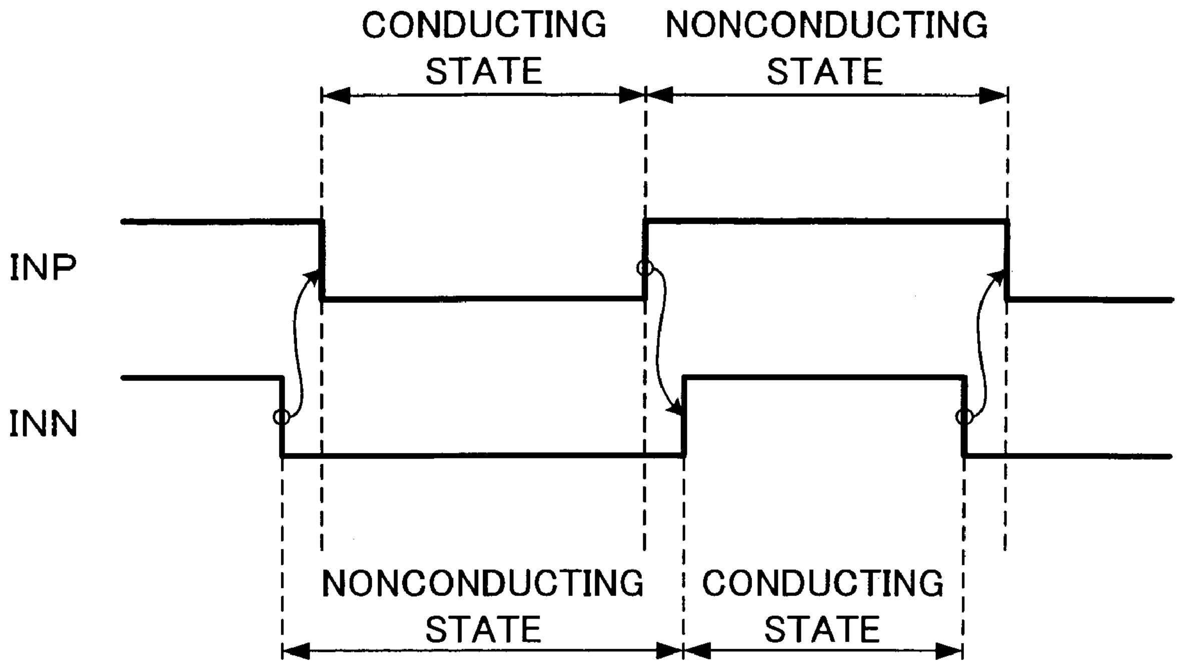
FIG. 14 is a diagram showing an example of timing of a gate signal shown in FIG. 13.

FIG. 14 shows an example of the timing of the gate signals INP and INN shown in FIG. 13.

The output transistor OTrp1 is set in a conducting state when the gate signal INP is set at the L level, and set in a nonconducting state when the gate signal INP is set at the H level. The output transistor OTrn1 is set in a nonconducting state when the gate signal INN is set at the L level, and set in a conducting state when the gate signal INN is set at the H level.

The gate signals INP and INN are generated so that the output transistors OTrp1 and OTrn1 are not simultaneously set in a conducting state (one or both of the output transistors OTrp1 and OTrn1 are set in a nonconducting state). The gate signals INP and INN are generated so that the period in which the gate signal INP changes from the H level to the L level does not overlap the period in which the gate signal INN changes from the H level to the L level. The gate signals INP and INN are generated so that the period in which the gate signal INP changes from the L level to the H level does not overlap the period in which the gate signal INN changes from the L level to the H level.

This prevents occurrence of a situation in which the source of the output transistor OTrp1 is electrically connected with the source of the output transistor OTrn1, whereby present consumption can be reduced.

The power supply circuit 100 shown in FIG. 13 controls the supply capability of the common electrode voltage VCOM by changing at least one of the current drive capability and the output voltage level of the VCOMH generation circuit (high-potential-side voltage generation circuit) 110 corresponding to the line data including the grayscale data of each dot corresponding to the voltage applied to the pixel electrode for the number of dots of one scan line. Or, the power supply circuit 100 shown in FIG. 13 controls the supply capability of the common electrode voltage VCOM by changing at least one of the current drive capability and the output voltage level of the VCOML generation circuit (low-potential-side voltage generation circuit) 120 corresponding to the line data including the grayscale data of each dot corresponding to the voltage applied to the pixel electrode for the number of dots of one scan line. Specifically, the power supply circuit 100 controls the supply capability of the common electrode voltage VCOM by changing at least one of the current drive capability of the VCOMH generation circuit (high-potential-side voltage generation circuit) 110, the output voltage level of the VCOMH generation circuit 110, the current drive capability of the VCOML generation circuit (low-potential-side voltage generation circuit) 120, and the output voltage level of the VCOML generation circuit 120 corresponding to the line data.

The power supply circuit 100 may include a power supply control circuit 150. The power supply control circuit 150 controls the supply capability of the common electrode voltage VCOM. The power supply control circuit 150 may generate a supply capability control signal for controlling the supply capability. In more detail, the power supply control circuit 150 may generate the supply capability control signal corresponding to the line data or the line value from the data driver 30. The power supply control circuit 150 generates the supply capability control signal based on a value set in a power supply capability setting register 160, for example. Control information such as the supply capability control signal which should be output and the output timing is stored in the power supply capability setting register 160 corresponding to the line data or the line value from the data driver 30.

The supply capability control signal of the common electrode voltage VCOM includes gate signals TRP1, TRP2, INP, INN, TRN1, and TRN2 and voltage generation control signals CNTH and CNTL. The voltage generation control signal CNTH includes a high-potential-side input voltage LEVINP, a present drive capability control signal BOOSTP, slew rate control signals VREFN1 and VREFN2, and a drive present source control signal REFN for generating the high-potential-side voltage VCOMH. The voltage generation control signal CNTL includes a low-potential-side input voltage LEVINN, a present drive capability control signal BOOSTN, slew rate control signals VREFP1 and VREFP2, and a drive present source control signal REFP for generating the low-potential-side voltage VCOML.

The power supply circuit 100 may include at least one P-type (first conductivity type) first auxiliary transistor to which a high-potential-side power supply voltage VOUT of the VCOM generation circuit 110 (high-potential-side voltage generation circuit) is supplied at the source and which is electrically connected with the output of the switch circuit 130 at the drain. The supply capability may be controlled by controlling the gate voltage of the first auxiliary transistor corresponding to the line data. This enables the current drive capability of the power supply circuit 100 to be increased or decreased. In FIG. 13, P-type transistors CTrp1 and CTrp2 are provided in parallel as the first auxiliary transistors, and controlled by the gate signals TRP1 and TRP2.

The power supply circuit 100 may include at least one N-type (second conductivity type) second auxiliary transistor to which a low-potential-side power supply voltage VOUTM of the VCOML generation circuit 120 (low-potential-side voltage generation circuit) is supplied at the source and which is electrically connected with the output of the switch circuit 130 at the drain. The supply capability may be controlled by controlling the gate voltage of the second auxiliary transistor corresponding to the line data. This enables the current drive capability of the power supply circuit 100 to be increased or decreased. In FIG. 13, N-type transistors CTrn1 and CTrn2 are provided in parallel as the second auxiliary transistors, and controlled by the gate signals TRN1 and TRN2.

The power supply circuit 100 may include a first operational amplifier to which the VCOMH generation circuit 110 (high-potential-side voltage generation circuit) outputs the high-potential-side voltage VCOMH based on the high-potential-side input voltage. When controlling the supply capability of the common electrode voltage VCOM, at least one of the present drive capability and the slew rate of the first operational amplifier may be changed corresponding to the line data. The high-potential-side voltage VCOMH may be changed by changing the high-potential-side input voltage corresponding to the line data. Or, the operating current of the first operational amplifier may be stopped or limited and the input and the output of the first operational amplifier may be electrically connected corresponding to the line data.

The power supply circuit 100 may include a second operational amplifier to which the VCOML generation circuit 120 (low-potential-side voltage generation circuit) outputs the low-potential-side voltage VCOML based on the low-potential-side input voltage. When controlling the supply capability, at least one of the current drive capability and the slew rate of the second operational amplifier may be changed corresponding to the line data. The low-potential-side voltage VCOML may be changed by changing the low-potential-side input voltage corresponding to the line data. Or, the operating current of the second operational amplifier may be stopped or limited and the input and the output of the second operational amplifier may be electrically connected corresponding to the line data.

In FIG. 13, the high-potential-side power supply voltage VOUT and the low-potential-side power supply voltage VOUTM are generated by a power supply voltage generation circuit 140 of the power supply circuit 100. In more detail, the power supply voltage generation circuit 140 includes a high-potential-side power supply voltage generation circuit 142 (first charge-pump circuit) and a low-potential-side power supply voltage generation circuit 144 (second charge-pump circuit). The high-potential-side power supply voltage generation circuit 142 generates the high-potential-side power supply voltage VOUT based on the power supply voltages VDD and VSS. The low-potential-side power supply voltage generation circuit 144 generates the low-potential-side power supply voltage VOUTM based on the power supply voltages VDD and VSS.

The high-potential-side power supply voltage generation circuit. 142 generates the high-potential-side power supply voltage VOUT by increasing the voltage between the power supply voltages VDD and VSS in the high-potential direction (positive direction) based on the power supply voltage VSS by a charge-pump operation in synchronization with a first charge clock signal. In this case, the supply capability of the common electrode voltage VCOM may be controlled by stopping the first charge clock signal or reducing the frequency of the first charge clock signal corresponding to the line data.

The low-potential-side power supply voltage generation circuit 144 generates the low-potential-side power supply voltage VOUTM by increasing (decreasing) the voltage between the power supply voltages VDD and VSS in the low-potential direction (negative direction) based on the power supply voltage VSS by a charge-pump operation in synchronization with a second charge clock signal. In this case, the supply capability may be controlled by stopping the second charge clock signal or reducing the frequency of the second charge clock signal corresponding to the line data.

Figure 15:
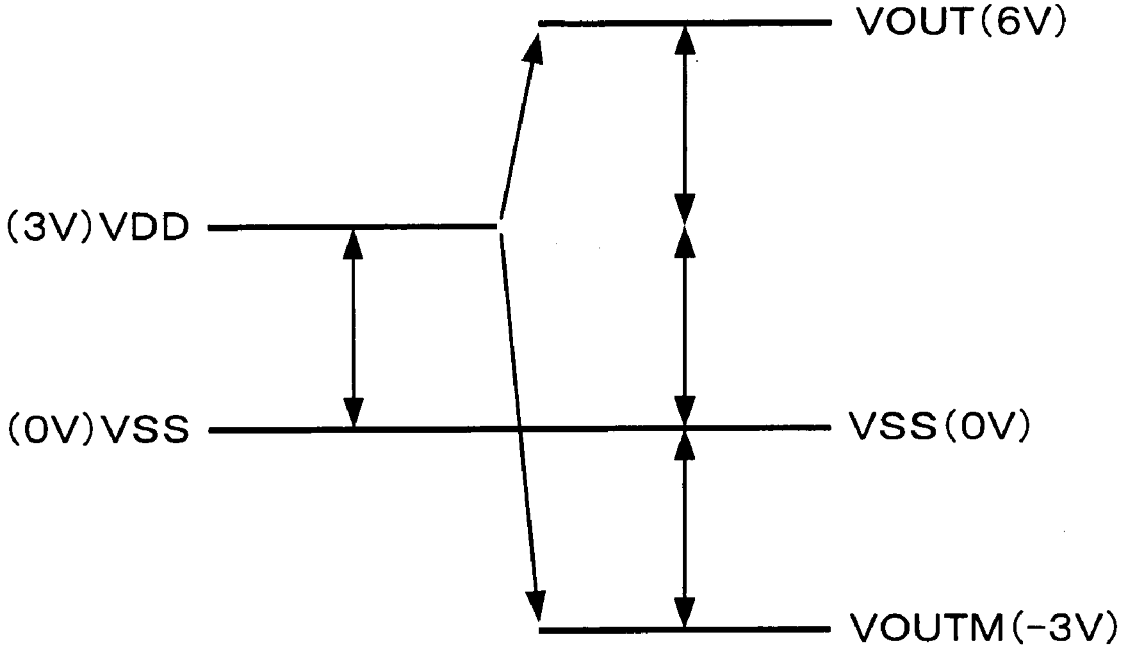
FIG. 15 is a schematic diagram illustrative of an operation example of a power supply voltage generation circuit shown in FIG. 13.

FIG. 15 is a schematic diagram illustrative of an operation example of the power supply voltage generation circuit 140 shown in FIG. 13.

The high-potential-side power supply voltage generation circuit 142 generates the high-potential-side power supply voltage VOUT (6 V) by increasing the voltage (3 V) between the power supply voltages VDD and VSS twice in the high-potential direction based on a potential of 0 V (=VSS) by the charge-pump operation in synchronization with the first charge clock signal.

The low-potential-side power supply voltage generation circuit 144 generates the low-potential-side power supply voltage VOUTM (−3 V) by increasing the voltage (3 V) between the power supply voltages VDD and VSS once (=×−1) in the low-potential direction based on a potential of 0 V (=VSS) by the charge-pump operation in synchronization with the second charge clock signal.

In FIG. 13, one charge clock signal is used as the first and second charge clock signals so that the high-potential-side power supply voltage generation circuit 142 and the low-potential-side power supply voltage generation circuit 144 perform the charge-pump operation in synchronization with one charge clock signal CK.

The power supply circuit 100 may perform at least one of the above-described supply capability control only in a period required based on the line data.

The power supply circuit 100 may perform at least one of the above-described supply capability control corresponding to the amount of change between the line data in the present horizontal scan period and the line data for one scan line in the horizontal scan period immediately before the present horizontal scan period. The power supply circuit 100 may perform at least one of the above-described supply capability control only in a period corresponding to the amount of change between the line data in the present horizontal scan period and the line data for one scan line in the horizontal scan period immediately before the present horizontal scan period.

When the grayscale data of each dot is j (j is an integer greater than one) bits, the line data may be data including higher-order k-bit (k<j, k is a natural number) data of the grayscale data of each dot for the number of dots of one scan line. The line data may be data in which k is one.

When the line value shown in FIG. 11 or 12 is supplied from the data driver 30, the power supply circuit 100 may change at least one of the current drive capability and the output voltage level of the VCOMH generation circuit 110 or at least one of the current drive capability and the output voltage level of the VCOML generation circuit 120 corresponding to the total value obtained by sequentially adding the grayscale data for the number of dots of one scan line, the grayscale data of each dot corresponding to the voltage applied to the pixel electrode.

The power supply circuit 100 may control the supply capability of the common electrode voltage VCOM corresponding to the total value. The power supply circuit 100 may perform at least one of the above-described supply capability control only in a period calculated based on the line value.

The power supply circuit 100 may perform at least one of the above-described supply capability control corresponding to the amount of change between the total value in the present horizontal scan period and the total value in the horizontal scan period immediately before the present horizontal scan period. The power supply circuit 100 may perform at least one of the above-described supply capability control for a period corresponding to the amount of change between the total value in the present horizontal scan period and the total value in the horizontal scan period immediately before the present horizontal scan period.

When the grayscale data of each dot is j (j is an integer greater than one) bits, the total value may be a value obtained by sequentially adding higher-order k-bit (k<j, k is a natural number) data of each piece of grayscale data for the number of dots of one scan line. The total value may be a total value in which k is one.

The major portion of the configuration of the power supply circuit 100 shown in FIG. 13 is described below in detail.

Figure 16:
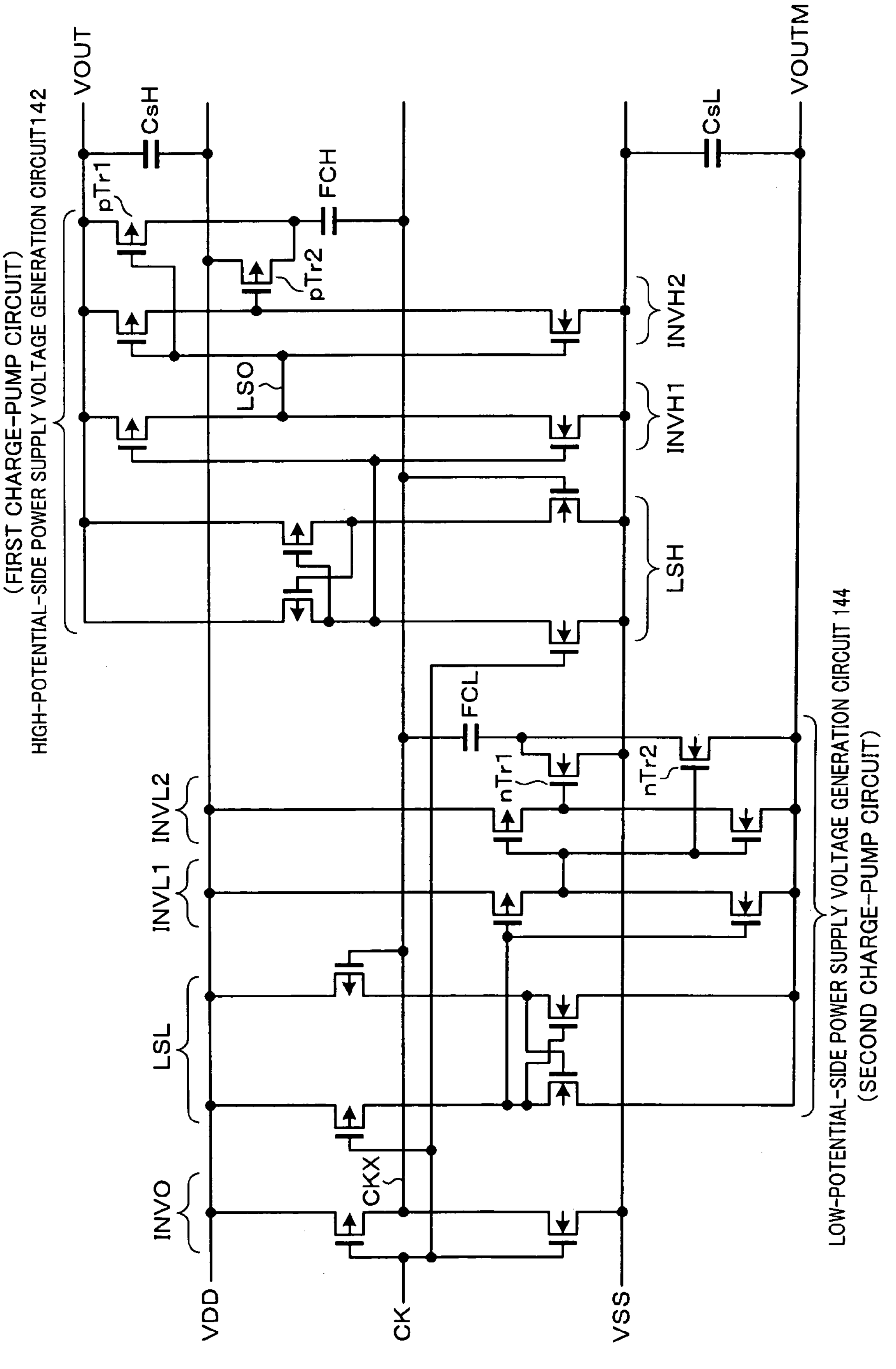
FIG. 16 is a circuit diagram showing a configuration example of the power supply voltage generation circuit shown in FIG. 13.

FIG. 16 is a circuit diagram showing a configuration example of the power supply voltage generation circuit 140 shown in FIG. 13.

The high-potential-side power supply voltage generation circuit 142 includes a level shifter LSH, inverters INVH1 and INVH2, and switching transistors pTr1 and pTr2. In FIG. 16, a flying capacitor FCH and a storage capacitor CsH are connected outside the power supply circuit 100. However, at least one of these capacitors may be provided in the power supply circuit 100 (high-potential-side power supply voltage generation circuit 142).

Figure 17:
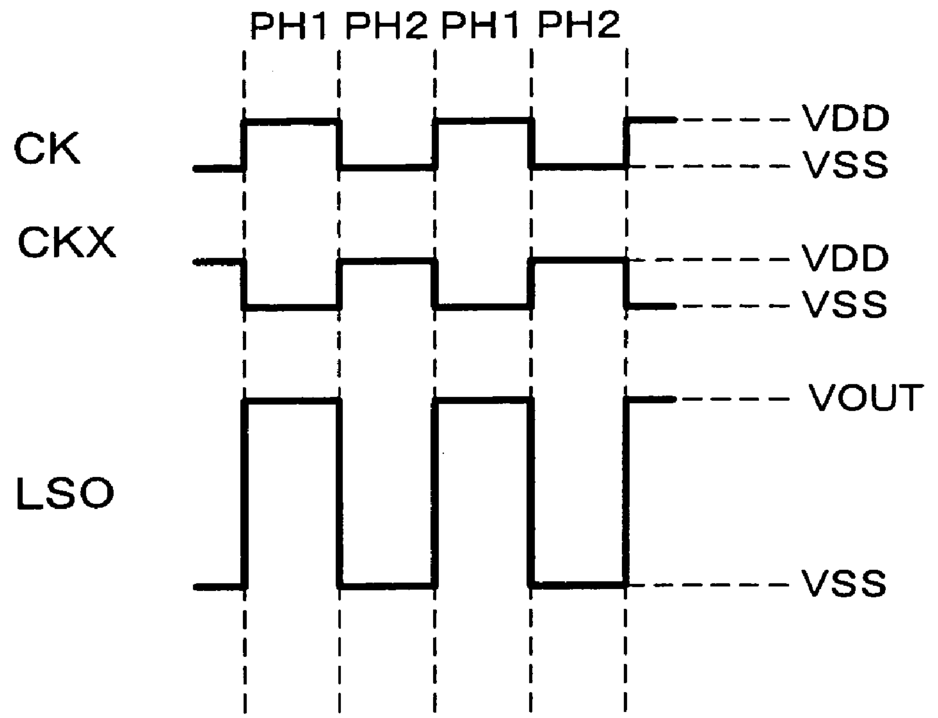
FIG. 17 is a timing diagram illustrative of the operation of a high-potential-side power supply voltage generation circuit.

FIG. 17 is a timing diagram illustrative of the operation of the high-potential-side power supply voltage generation circuit 142.

The charge clock signal CK having the voltage between the power supply voltages VDD and VSS as the amplitude voltage is supplied to the level shifter LSH. When one of two N-type transistors forming the level shifter LSH is set in a conducting state, the other N-type transistor is set in a nonconducting state. For example, the drain voltage of the P-type transistor is determined so that a drain current occurs in the N-type transistor to which the charge clock signal CK is supplied at its gate. The logic level of the output signal of the level shifter LSH is reversed by the inverter INVH1 so that an output signal LSO is obtained. The logic level of the output signal LSO is reversed by the inverter INVH2. The output signal LSO is supplied to the gate of the P-type transistor pTr1. The inversion signal of the output signal LSO is supplied to the gate of the P-type transistor pTr2.

The period in which the logic level of the output signal LSO is set at the H level is called a period PH1, and the period in which the logic level of the output signal LSO is set at the L level is called a period PH2. In the period PH1, the transistor pTr1 is set in a nonconducting state, and the transistor pTr2 is set in a conducting state. Therefore, the voltage VSS of an inversion charge clock signal CKX is supplied to one end of the flying capacitor FCH, and the voltage VDD is supplied to the other end of the flying capacitor FCH. In the period PH2, the transistor pTr1 is set in a conducting state, and the transistor pTr2 is set in a nonconducting state. Therefore, the voltage VDD of the inversion charge clock signal CKX is supplied to one end of the flying capacitor FCH, and the other end is electrically connected with the high-potential-side output power supply line. Since an electric charge corresponding to the voltage between the power supply voltage VDD and VSS has been stored in the flying capacitor FCH in the period PH1, the voltage of the high-potential-side output power supply line is set at a voltage "VDD×2" in the period PH2. The voltage of the high-potential-side output power supply line is output as the voltage VOUT. The voltage level of the high-potential-side output power supply line is retained by the storage capacitor CsH in the period PH1.

The low-potential-side power supply voltage generation circuit 144 includes a level shifter LSL, inverters INVL1 and INVL2, and switching transistors nTr1 and nTr2. In FIG. 16, a flying capacitor FCL and a storage capacitor CsL are connected outside the power supply circuit 100. However, at least one of these capacitors may be provided in the power supply circuit 100 (low-potential-side power supply voltage generation circuit 144).

The operation of the low-potential-side power supply voltage generation circuit 144 is a charge-pump operation similar to that of the high-potential-side power supply voltage generation circuit 142. Therefore, detailed description is omitted. Since an electric charge corresponding to the voltage between the power supply voltages VDD and VSS has been stored in the flying capacitor FCL, the low-potential-side power supply voltage generation circuit 144 supplies a voltage VOUTM in the negative direction with respect to the voltage VSS to the low-potential-side output power supply line. The voltage of the low-potential-side output power supply line is the voltage VOUTM, and the voltage level of the low-potential-side output power supply line is held by the storage capacitor CsL.

In the high-potential-side power supply voltage generation circuit 142 and the low-potential-side power supply voltage generation circuit 144 having such a configuration, the charge clock signal is stopped or the frequency of the charge clock signal is reduced corresponding to the line data or the amount of change in the line data or the total value or the amount of change in the total value. This enables the supply capability of the common electrode voltage VCOM to be controlled by changing the voltage supply capability of the high-potential-side voltage VCOMH or the low-potential-side voltage VCOML.

Figure 18A:
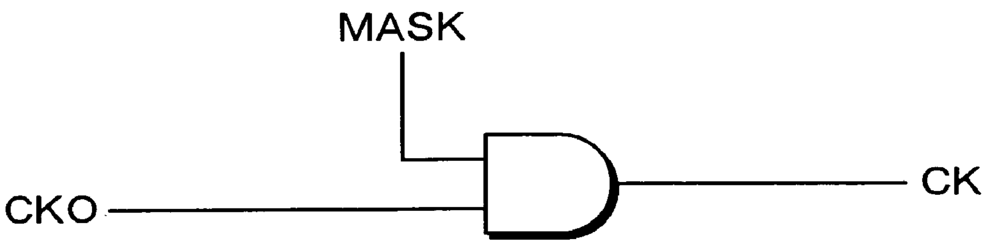
FIGS. 18A and 18B are diagrams showing configuration examples which realize control of a charge clock signal of the power supply voltage generation circuit shown in FIG. 16.
Figure 18B:
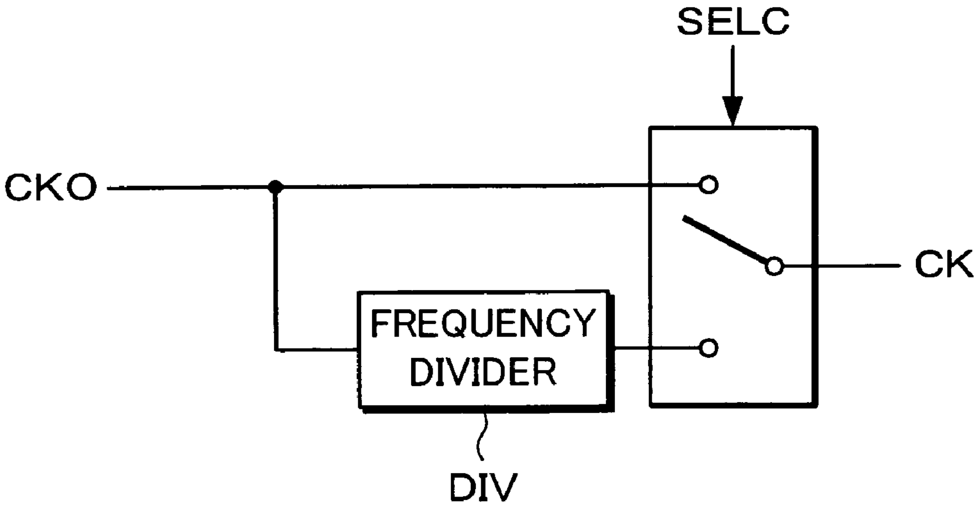

FIGS. 18A and 18B show configuration examples which realize control of the charge clock signal of the power supply voltage generation circuit 140 shown in FIG. 16.

FIG. 18A shows a configuration for masking an original clock signal CKO by using a mask signal MASK generated based on the line data or the amount of change in the line data or the total value or the amount of change in the total value. In this case, the operation or suspension of the charge clock signal CK is controlled by using the mask signal MASK.

FIG. 18B shows a configuration for reducing the frequency of the charge clock signal CK by using a select signal SELC generated based on the line data or the amount of change in the line data or the total value or the amount of change in the total value. A frequency divider DIV divides the frequency of the original clock signal CKO by S (S is a number of two or more). One of the original clock signal CKO and the output of the frequency divider DIV selected based on the select signal SELC is output as the charge clock signal CK.

A configuration example of the VCOMH generation circuit 110 and the VCOML generation circuit 120 is described below.

Figure 19:
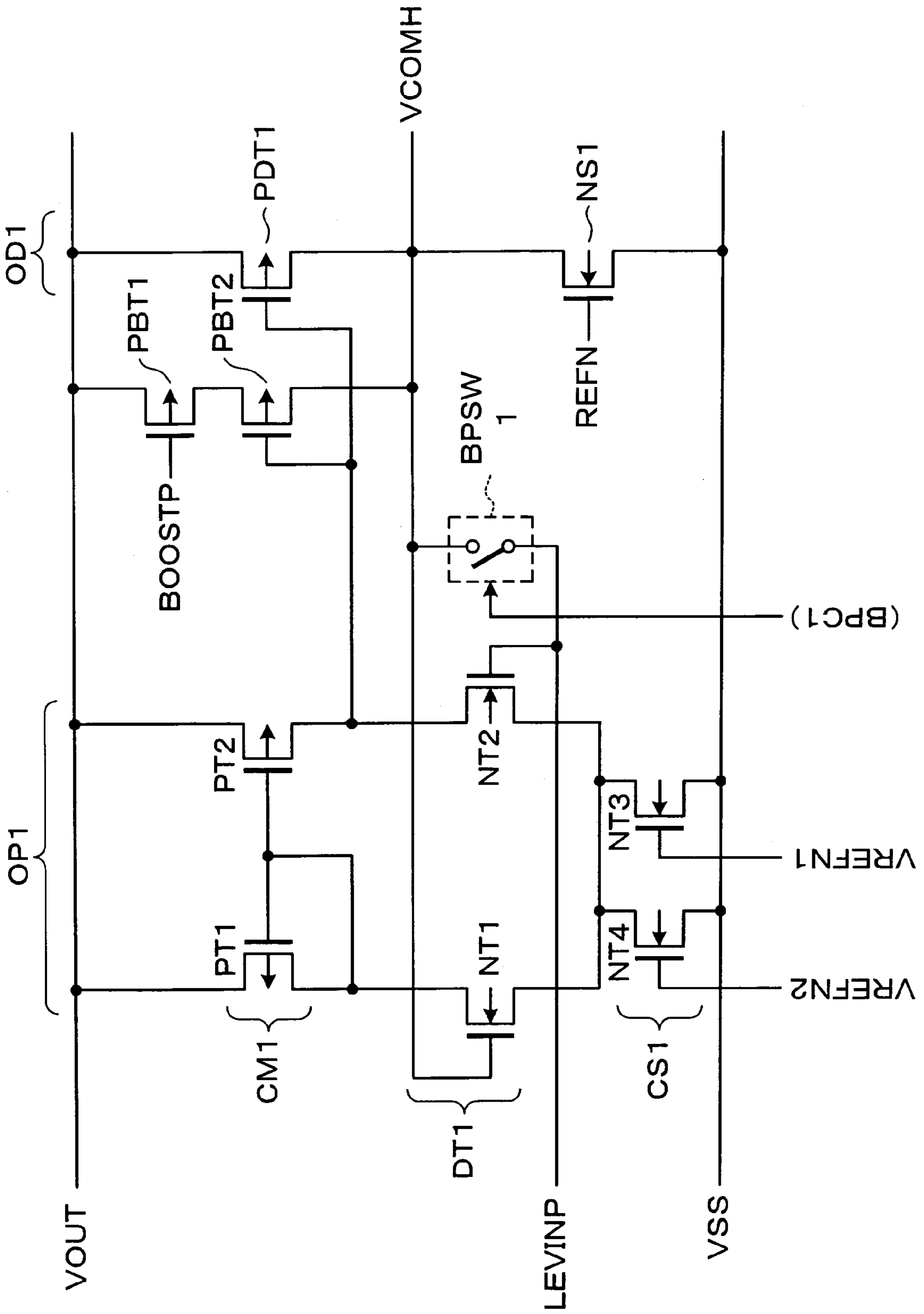
FIG. 19 is a circuit diagram showing a configuration example of a VCOMH generation circuit shown in FIG. 13.

FIG. 19 is a circuit diagram showing a configuration example of the VCOMH generation circuit 110 shown in FIG. 13.

The VCOMH generation circuit 110 includes a differential section OP1 forming the first operational amplifier and an output section OD1.

The differential section OP1 includes a current mirror circuit CM1, a differential transistor pair DT1, and a current source CS1. The current mirror circuit CM1 includes P-type transistors PT1 and PT2 to which the power supply voltage VOUT is supplied at the source. The gates of the transistors PT1 and PT2 are connected, and the gate and the drain of the transistor PT1 are connected.

The differential transistor pair DT1 includes N-type transistors NT1 and NT2. The output voltage VCOMH of the output section OD1 is supplied to the gate of the transistor NT1. A high-potential-side input voltage LEVINP is supplied to the gate of the transistor NT2. The drain of the transistor NT1 is connected with the drain of the transistor PT1. The drain of the transistor NT2 is connected with the drain of the transistor PT2.

The current source CS1 is inserted between the sources of the N-type transistors NT1 and NT2 and the power supply line to which the power supply voltage VSS is supplied. In the current source CS1, two N-type transistors NT3 and NT4 are connected in parallel. The slew rate control signals VREFN1 and VREFN2 are respectively supplied to the gates of the N-type transistors NT3 and NT4. Therefore, the current value of the current source CS1 is controlled corresponding to the slew rate control signals VREFN1 and VREFN2.

The output section OD1 includes a P-type driver transistor PDT1 and an N-type current source transistor NS1. The high-potential-side power supply voltage VOUT is supplied to the source of the P-type driver transistor PDT1. The low-potential-side power supply voltage VSS is supplied to the source of the N-type current source transistor NS1. The voltage of the connection node between the transistor NT2 and the transistor PT2 is supplied to the gate of the P-type driver transistor PDT1. The drive current source control signal REFN is supplied to the gate of the N-type current source transistor NS1. The drain of the P-type driver transistor PDT1 is connected with the drain of the N-type current source transistor NS1. This drain voltage is the output voltage VCOMH.

The output section OD1 includes boost P-type driver transistors PBT1 and PBT2 connected in series and provided in parallel to the P-type driver transistor PDT1. In more detail, the boost P-type driver transistors PBT1 and PBT2 are connected in parallel with the P-type driver transistor PDT1 when a current drive capability control signal BOOSTP is set at the L level. This enables the capability of causing present to flow toward the output to be increased corresponding to the current drive capability control signal BOOSTP.

The VCOMH generation circuit 110 may include a bypass switch BPSW1 which bypasses the input and the output of the differential section OP1. The high-potential-side voltage VCOMH can be set at the high-potential-side input voltage LEVINP by setting the bypass switch BPSW1 in a conducting state by using a bypass control signal BPC1 which ON/OFF controls the bypass switch BPSW1. In this case, it is preferable to stop the current of the current source CS1 and the N-type current source transistor NS1 by using the slew rate control signals VREFN1 and VREFN2 and the drive current source control signal REFN.

The high-potential-side input voltage LEVINP, the slew rate control signals VREFN1 and VREFN2, the current drive capability control signal BOOSTP, the drive current source control signal REFN, and the bypass control signal BPC1 input to the VCOMH generation circuit 110 are supplied from the power supply control circuit 150 shown in FIG. 13.

In the VCOMH generation circuit 110 having such a configuration, consider the case where the bypass switch BPSW1 is set in a nonconducting state, the boost P-type driver transistor PBT1 is set in a nonconducting state, and the high-potential-side input voltage LEVINP is higher than the output voltage VCOMH. In this case, since the impedance of the transistor NT1 becomes higher than that of the transistor NT2, the gate voltage of the transistors PT1 and PT2 is increased, so that the impedance of the transistor PT2 is increased. Therefore, the gate voltage of the P-type driver transistor PDT1 is decreased, so that the P-type driver transistor PDT1 approaches the ON state. Therefore, the output voltage VCOMH is increased.

On the other hand, consider the case where the high-potential-side input voltage LEVINP is lower than the output voltage VCOMH. In this case, since the impedance. of the transistor NT1 becomes lower than that of the transistor NT2, the gate voltage of the transistors PT1 and PT2 is decreased, so that the impedance of the transistor PT2 is decreased. Therefore, the gate voltage of the P-type driver transistor PDT1 is increased, so that the P-type driver transistor PDT1 approaches the OFF state. Therefore, the output voltage VCOMH is decreased.

As a result of the above-described operation, the VCOMH generation circuit 110 transitions to an equilibrium in which the high-potential-side input voltage LEVINP becomes approximately equal to the output voltage VCOMH.

In the differential section OP1, the reaction rate of each transistor forming the current mirror circuit CM1 and the differential transistor pair DT1 can be increased as the current value of the current source CS1 is increased. Therefore, the slew rate of the VCOMH generation circuit 110 can be increased. The slew rate used herein is the value indicating the maximum inclination of the output voltage per unit time.

In the output section OD1, the capability of causing current to flow toward the node to which the output voltage VCOMH is supplied can be increased by setting the boost P-type driver transistor PBT1 in a conducting state.

Figure 20:
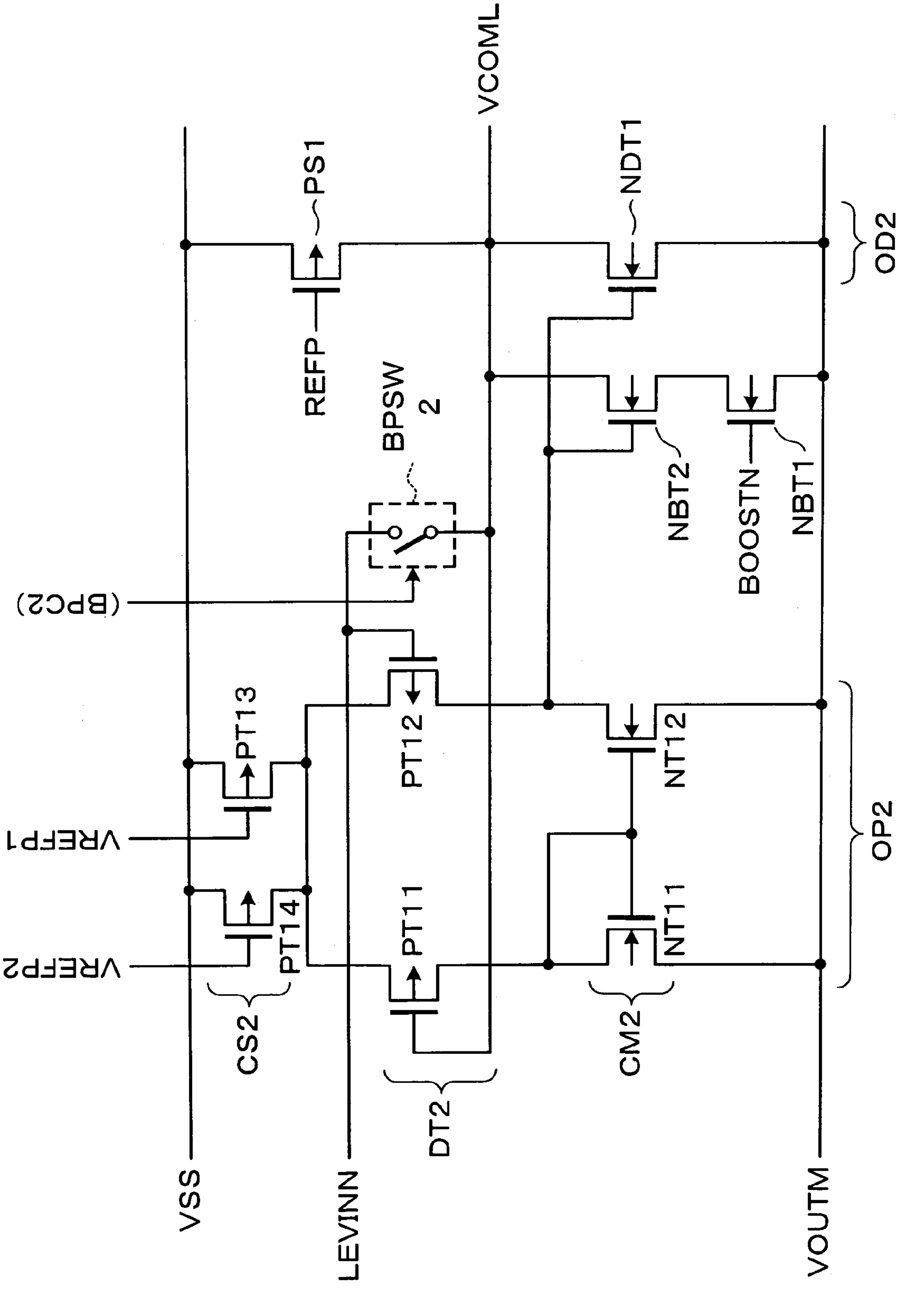
FIG. 20 is a circuit diagram showing a configuration example of a VCOML generation circuit shown in FIG. 13.

FIG. 20 is a circuit diagram showing a configuration example of the VCOML generation circuit 120 shown in FIG. 13.

The VCOML generation circuit 120 includes a differential section OP2 forming the second operational amplifier and an output section OD2.

The differential section OP2 includes a current mirror circuit CM2, a differential transistor pair DT2, and a current source CS2. The current mirror circuit CM2 includes N-type transistors NT1 and NT2 to which the power supply voltage VOUTM is supplied at the source. The gates of the transistors NT1 and NT2 are connected, and the gate and the drain of the transistor NT1 are connected.

The differential transistor pair DT2 includes P-type transistors PT11 and PT12. The output voltage VCOML of the output section OD2 is supplied to the gate of the transistor PT11. A low-potential-side input voltage LEVINN is supplied to the gate of the transistor PT12. The drain of the transistor PT11 is connected with the drain of the transistor NT11. The drain of the transistor PT12 is connected with the drain of the transistor NT12.

The current source CS2 is inserted between the sources of the P-type transistors PT11 and PT12 and the power supply line to which the power supply voltage VSS is supplied. In the current source CS2, two P-type transistors PT13 and PT14 are connected in parallel. The slew rate control signals VREFP1 and VREFP2 are respectively supplied to the gates of the P-type transistors PT13 and PT14. Therefore, the current value of the current source CS2 is controlled corresponding to the slew rate control signals VREFP1 and VREFP2.

The output section OD2 includes an N-type driver transistor NDT1 and a P-type current source transistor PS1. The power supply voltage VOUTM is supplied to the source of the N-type driver transistor NDT1. The power supply voltage VSS is supplied to the source of the P-type current source transistor PS1. The voltage of the connection node between the transistor PT12 and the transistor NT12 is supplied to the gate of the N-type driver transistor NDT1. The drive current source control signal REFP is supplied to the gate of the P-type current source transistor PS1. The drain of the N-type driver transistor NDT1 is connected with the drain of the P-type current source transistor PS1. This drain voltage is the output voltage VCOML.

The output section OD2 includes boost N-type driver transistors NBT1 and NBT2 connected in series and provided in parallel to the N-type driver transistor NDT1. In more detail, the boost N-type driver transistors NBT1 and NBT2 are connected in parallel with the N-type driver transistor NDT1 when a current drive capability control signal BOOSTN is set at the H level. This enables the capability of drawing present from the output to be increased corresponding to the current drive capability control signal BOOSTN.

The VCOML generation circuit 120 may include a bypass switch BPSW2 which bypasses the input and the output of the differential section OP2. The low-potential-side voltage VCOML can be set at the low-potential-side input voltage LEVINN by setting the bypass switch BPSW2 in a conducting state by using a bypass control signal BPC2 which ON/OFF controls the bypass switch BPSW2. In this case, it is preferable to stop the current of the current source CS2 and the P-type current source transistor PS1 by using the slew rate control signals VREFP1 and VREFP2 and the drive current source control signal REFP.

The high-potential-side input voltage LEVINN, the slew rate control signals VREFP1 and VREFP2, the current drive capability control signal BOOSTN, the drive current source control signal REFP, and the bypass control signal BPC2 input to the VCOML generation circuit 120 are supplied from the power supply control circuit 150 shown in FIG. 13.

In the VCOML generation circuit 120 having such a configuration, consider the case where the bypass switch BPSW2 is set in a nonconducting state, the boost N-type driver transistor NBT1 is set in a nonconducting state, and the low-potential-side input voltage LEVINN is higher than the output voltage VCOML. In this case, since the impedance of the transistor PT11 becomes higher than that of the transistor PT12, the gate voltage of the transistors NT11 and NT12 is increased, so that the impedance of the transistor NT12 is increased. Therefore, the gate voltage of the N-type driver transistor NDT1 is decreased, so that the N-type driver transistor NDT1 approaches the OFF state. Therefore, the output voltage VCOML is increased.

On the other hand, consider the case where the low-potential-side input voltage LEVINN is lower than the output voltage VCOML. In this case, since the impedance of the transistor PT11 becomes higher than that of the transistor PT12, the gate voltage of the transistors NT11 and NT12 is decreased, so that the impedance of the transistor NT12 is increased. Therefore, the gate voltage of the N-type driver transistor NDT1 is increased, so that the N-type driver transistor NDT1 approaches the ON state. Therefore, the output voltage VCOML is decreased.

As a result of the above-described operation, the VCOML generation circuit 120 transitions to an equilibrium in which the low-potential-side input voltage LEVINN becomes approximately equal to the output voltage VCOML.

In the differential section OP2, the reaction rate of each transistor forming the current mirror circuit CM2 and the differential transistor pair DT2 can be increased as the current value of the current source CS2 is increased. Therefore, the slew rate of the VCOML generation circuit 120 can be increased.

In the output section OD2, the capability of drawing current from the node to which the output voltage VCOML is supplied can be increased by setting the boost N-type driver transistor NBT1 in a conducting state.

2.3.1 Power Supply Capability Setting Register

The power supply control circuit 150 controls the supply capability of the common electrode voltage VCOM as described above based on the value set in the power supply capability setting register 160.

FIG. 21 shows an example of the power supply capability setting register 160 shown in FIG. 13.

FIG. 21 shows an example of controlling the gate signals of the first and second auxiliary transistors CTrp1, CTrp2, CTrn1, and CTrn2, the slew rate control signals VREFN1 and VREFN2, offset of the high-potential-side input voltage LEVINP, and the charge clock signals CK. The same description also applies to other control signals and the like. All of or only some of the control signals may be controlled as described below.

The power supply capability setting register 160 stores the control information for generating the control signal for controlling the supply capability of the common electrode voltage VCOM while associating the supply capability with the line value from the data driver 30. The control information is set by the host or the display controller.

In FIG. 21, the control information is stored while being associated with the line value. However, the control information may be stored while being associated with the line data, the amount of change in the line data, or the amount of change in the line value.

FIG. 22 shows another example of the power supply capability setting register 160.

In FIG. 22, the control information set in the power supply capability setting register 160 is information which designates the ON timing and the OFF timing of the control signal for controlling the supply capability of the common electrode voltage VCOM.

Figure 23:
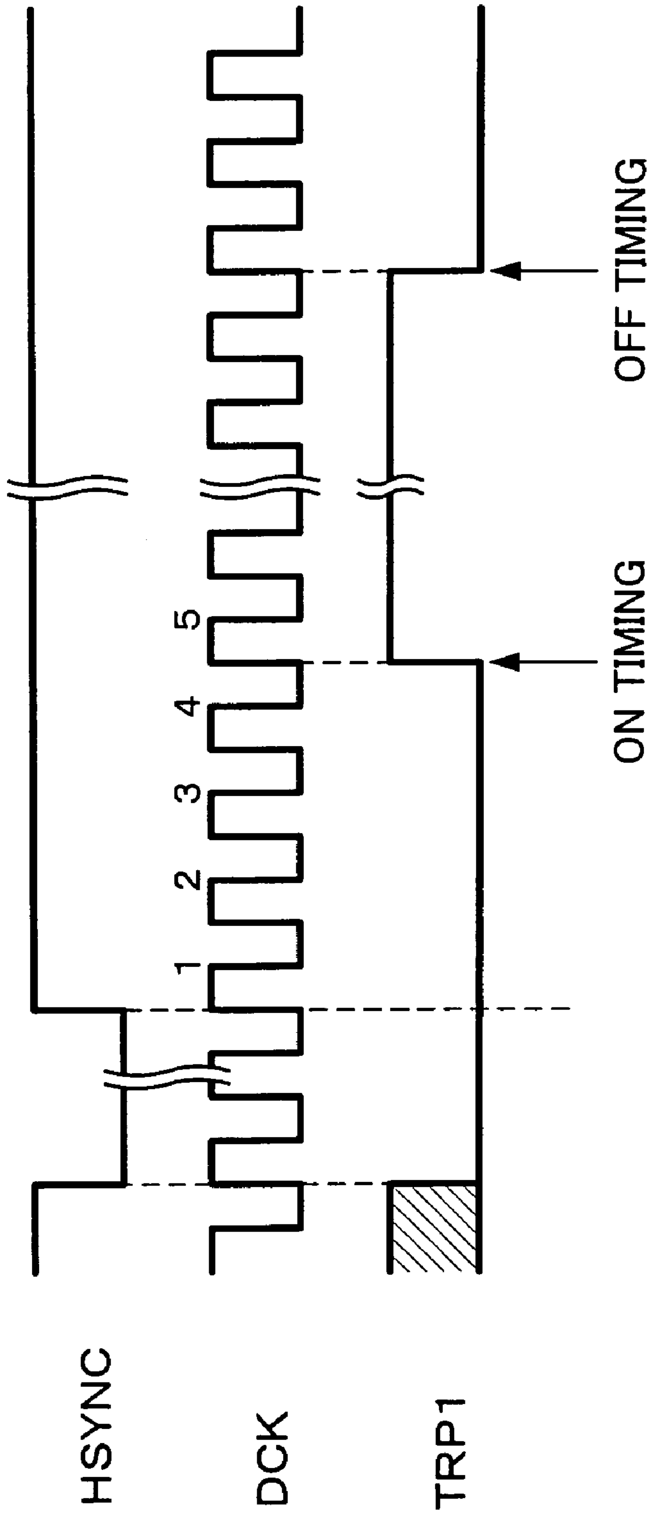
FIG. 23 is a diagram illustrative of control information set in the power supply capability setting register shown in FIG. 22.

FIG. 23 is a diagram illustrative of the control information set in the power supply capability setting register shown in FIG. 22.

For example, the control information may include the ON timing specified by the number of dot clock signals DCK with respect to the falling edge of the horizontal synchronization signal HSYNC, and the OFF timing specified by the number of dot clock signals DCK with respect to the falling edge.

In FIG. 22, the control information is stored while being associated with the line value. However, the control information may be stored while being associated with the line data, the amount of change in the line data, or the amount of change in the line value.

This enables the supply capability of the common electrode voltage VCOM to be controlled only in a period determined based on the line data or the amount of change in the line data or the line value or the amount of change in the line value.

In the above-described power supply capability setting register, the control information including the type and time of control signal which should be controlled is determined depending on the load of the common electrode of the LCD panel 20 and the output configuration of the data driver 30.

2.4 First Configuration Example

A first configuration example illustrates the case of controlling the supply capability of the common electrode voltage VCOM when performing a line inversion drive. In the first configuration example, the supply capability of the common electrode voltage VCOM is controlled by receiving the line value from the data driver 30. However, the supply capability may be controlled by receiving the line data from the data driver 30.

Figure 24:
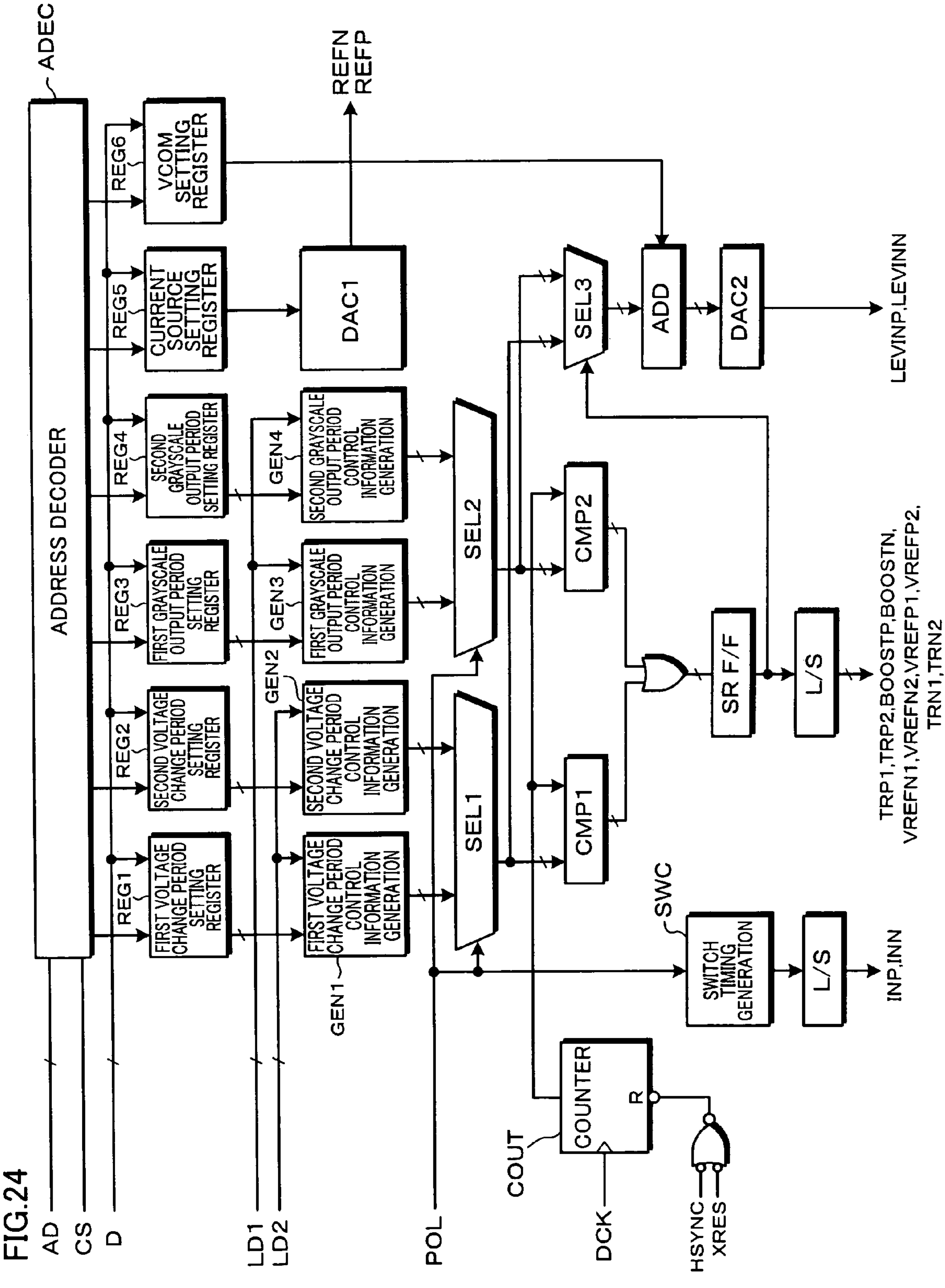
FIG. 24 is a block diagram showing a configuration example of a power supply control circuit according to a first configuration example.

FIG. 24 is a block diagram showing a configuration example of a power supply control circuit according to the first configuration example. The power supply control circuit corresponds to the power supply control circuit 150 shown in FIG. 13.

When performing a line inversion drive, the supply capability control of the common electrode voltage VCOM corresponding to the line data or the like is caused to differ between the voltage change period immediately after the common electrode voltage VCOM changes and the subsequent grayscale output period.

Therefore, the power supply capability setting register stores control information for the positive voltage change period and grayscale output period and control information for the negative voltage change period and grayscale output period. The power supply control circuit acquires a voltage change period line value and a grayscale output period line value from the data driver 30, and controls the supply capability of the common electrode voltage VCOM based on the acquired line value.

In FIG. 24, the power supply capability setting register includes first and second voltage change period setting registers REG1 and REG2, first and second grayscale output period setting registers REG3 and REG4, a current source setting register REG5, and a VCOM setting register REG6. Information set in the first voltage change period setting register REG1 is used for the positive voltage change period. Information set in the first grayscale output period setting register REG3 is used for the positive grayscale output period. Information set in the second voltage change period setting register REG2 is used for the negative voltage change period. Information set in the second grayscale output period setting register REG3 is used for the negative grayscale output period.

The current source setting register REG5 stores control information for generating the drive current source control signals REFN and REFP. Specifically, a digital/analog converter DAC1 generates signals at voltage levels corresponding to the control information set in the current source setting register REG5, and outputs the generated signals as the drive current source control signals REFN and REFP.

The VCOM setting register REG6 stores control information for generating the high-potential-side input voltage LEVINP and the low-potential-side input voltage LEVINN. The high-potential-side input voltage LEVINP and the low-potential-side input voltage LEVINN are generated after an offset value has been added to the control information. The offset value is generated corresponding to the line data or the like as shown in FIG. 21 or 22.

The information is set in the first and second voltage change period setting registers REG1 and REG2, the first and second grayscale output period setting registers REG3 and REG4, the current source setting register REG5, and the VCOM setting register REG6 by the host or the display controller. The host or the display controller outputs address data AD which specifies one of the registers and a chip select CS. When the chip select CS is set to active, an address decoder ADEC sets access data D from the host or the display controller in one of the registers specified based on the address data AD. The access data D is the control information.

In the first configuration example, a voltage change period line value LD2 and a grayscale output period line value LD1 are independently supplied from the data driver 30.

FIG. 25 shows an example of the line value in each period supplied from the data driver 30.

In the voltage change period, the line value is the preceding line value. The preceding line value is a line value in the horizontal scan period immediately before the present horizontal scan period. The line value is calculated as shown in FIG. 11 or 12. In the voltage change period, since voltage is not applied to the pixel electrode based on the line data in the present horizontal scan period, the line data in the present horizontal scan period is not taken into consideration.

In the grayscale output period, the line value is calculated based on the value obtained by adding the present line value to the value obtained by adding a corresponding correction value to the preceding line value. The present line value is the line value in the present horizontal scan period.

Figure 26:
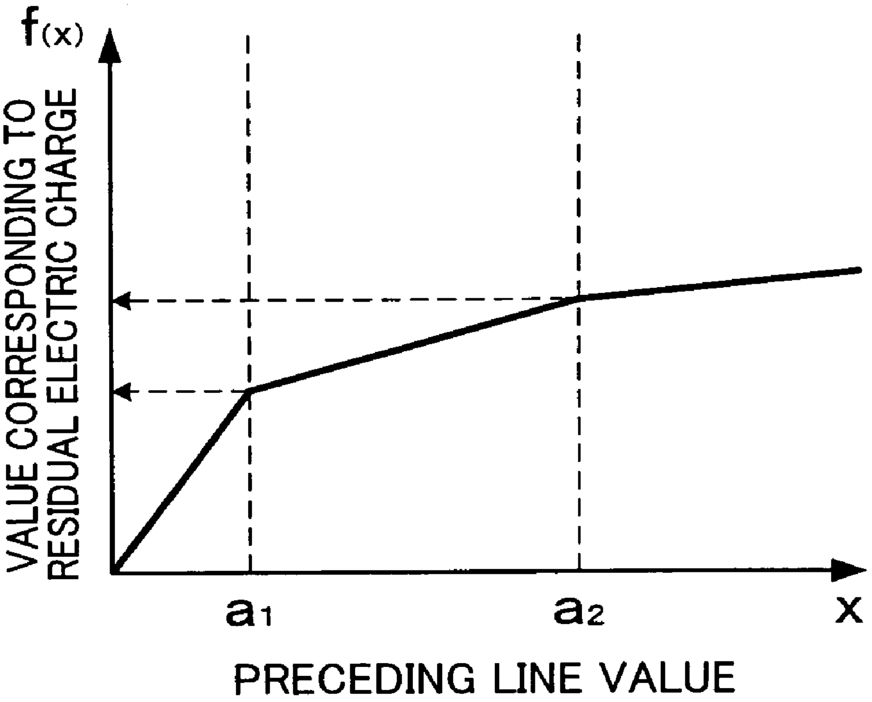
FIG. 26 is a diagram illustrative of a correction value corresponding to a preceding line value.

FIG. 26 is a diagram illustrative of the correction value corresponding to the preceding line value.

When the preceding line value is indicated by x, the correction value corresponds to f(x) as shown in FIG. 26. The correction value is a value determined taking into consideration the amount of electric charge remaining in the present horizontal scan period due to the remaining electric charge supplied to the pixel electrode or the data line in the horizontal scan period immediately before the present horizontal scan period. The amount of residual electric charge can be associated with the voltage applied to the pixel electrode in the horizontal scan period immediately before the present horizontal scan period. Therefore, the correction value can be associated with the preceding line value.

In FIG. 26, the preceding line value is linearly approximate to f(x) as $a_1$ and $a_2$ as boundaries. The preceding line value $a_1$ is determined according to the grayscale characteristics of the LCD panel 20. In the grayscale characteristics, a change in voltage per grayscale increases in the region in which the grayscale value is large or small, and a change in voltage per grayscale decreases in the intermediate region of the grayscale value. The preceding line value $a_1$ is a value corresponding to the boundary between the region in which a change in voltage is large (grayscale value is small) and the intermediate region in which a change in voltage is small in the grayscale characteristics.

The preceding line value $a_2$ is a value corresponding to the voltage clamped by an output protection diode or the like of the data driver 30 which drives the data line. Specifically, since current flows through the diode or the like at a voltage higher than the voltage generated by the grayscale data corresponding to the preceding line value $a_2$, the slope of the linear approximation is caused to differ.

In FIG. 24, the voltage change period line value LD2 is supplied to first and second voltage change period control information generation sections GEN1 and GEN2. The first voltage change period control information generation section GEN1 extracts the control information corresponding to the line value LD2 from the control information set in the first voltage change period setting register REG1. The second voltage change period control information generation section GEN2 extracts the control information corresponding to the line value LD2 from the control information set in the first voltage change period setting register REG2.

Based on the polarity inversion signal POL from the data driver 30, a selector SEL1 selects the output of the first voltage change period control information generation section GEN1 in the positive period and selects the output of the second voltage change period control information generation section GEN2 in the negative period.

The grayscale output period line value LD1 is supplied to the first and second grayscale output period control information generation sections GEN3 and GEN4. The first grayscale output period control information generation section GEN3 extracts the control information corresponding to the line value LD1 from the control information set in the first grayscale output period setting register REG3. The second grayscale output period control information generation section GEN4 extracts the control information corresponding to the line value LD1 from the control information set in the second grayscale output period setting register REG4.

Based on the polarity inversion signal POL, a selector SEL2 selects the output of the first grayscale output period control information generation section GEN3 in the positive period and selects the output of the second grayscale output period control information generation section GEN4 in the negative period.

A counter COUT increments a counter value, which is initialized at the edge of the horizontal synchronization signal HSYNC or the edge of a reset signal XRES, in synchronization with the dot clock signal DCK.

A comparator CMP1 compares the control information selected by the selector SEL1 with the counter value, and outputs a pulse when the control information coincides with the counter value. A comparator CMP2 compares the control information selected by the selector SEL2 with the counter value, and outputs a pulse when the control information coincides with the counter value. A set-reset flip-flop is set or reset based on the logical OR result of these pulses. The output of the set-reset flip-flop is converted in voltage level by a level shifter, and output as various control signals which realize the supply capacity control of the common electrode voltage VCOM.

FIG. 24 shows only the configuration of generating one control signal. A similar configuration is provided in units of control signals which realize the supply capacity control of the electrode voltage VCOM.

In FIG. 24, period designation information which designates the voltage change period and the grayscale output period in polarity units is stored in one of the first and second voltage change period setting registers REG1 and REG2 and the first and second grayscale output period setting registers REG3 and REG4. The period designation information output from the Set-reset flip-flop is supplied to a selector SEL3. Control information for changing the offset value which changes the high-potential-side voltage VCOMH and the low-potential-side voltage VCOML is supplied to the selector SEL3 from the selectors SEL1 and SEL2. The selector SEL3 outputs one piece of the control information based on the period designation information.

An adder ADD adds the control information and the control information set in the VCOM setting register REG6. A digital/analog converter DAC2 generates signals at voltage levels corresponding to the addition result of the adder ADD, and output the generated signals as the high-potential-side input voltage LEVINP and the low-potential-side input voltage LEVINN. This enables the high-potential-side input voltage LEVINP or the low-potential-side input voltage LEVINN to be changed corresponding to the line data or the amount of change in the line data or the line value or the amount of change in the line value, so that the voltage level of the common electrode voltage VCOM can be changed.

The polarity inversion signal POL is supplied to a switch timing generation circuit SWC. The switch timing generation circuit SWC generates the gate signals INP and INN which change at the timing shown in FIG. 14 based on the polarity inversion signal POL, and outputs the gate signals INP and INN to the switch circuit 130 after voltage level conversion.

Figure 27:
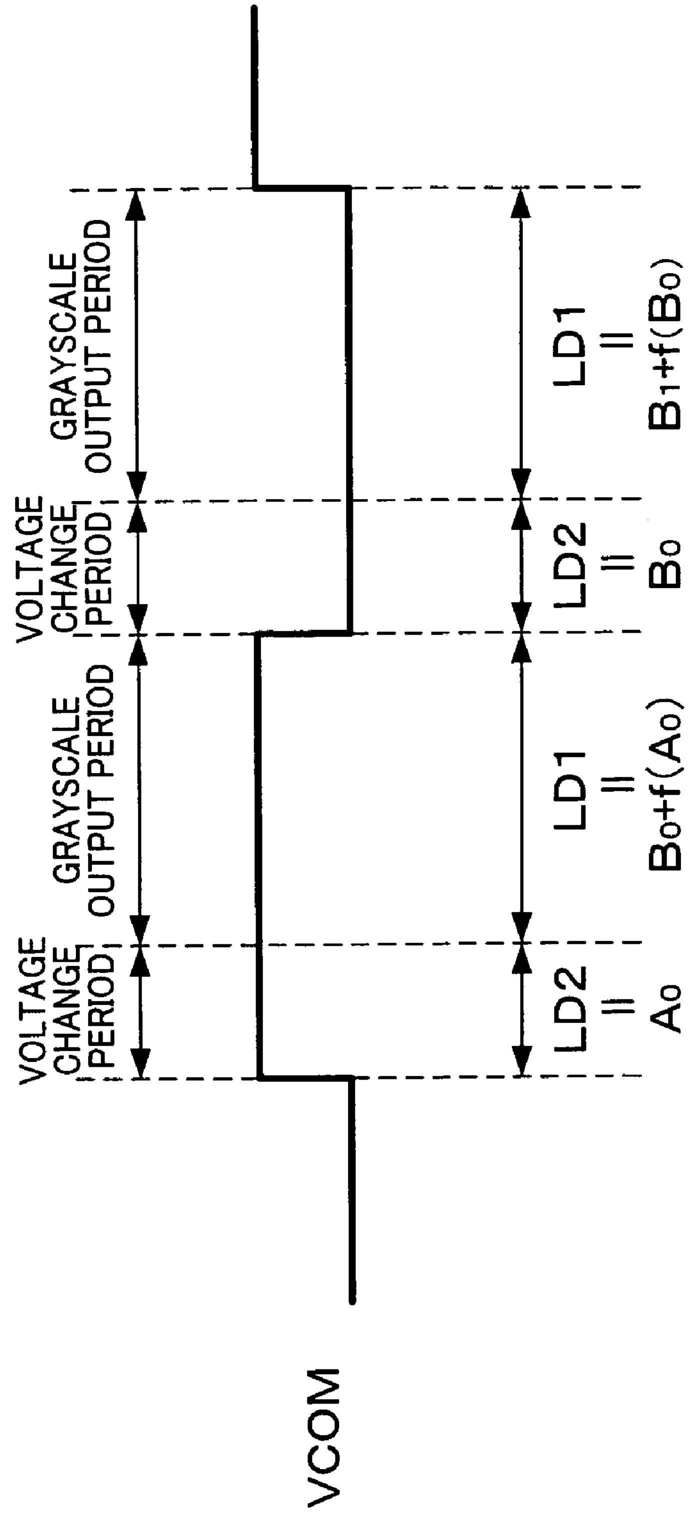
FIG. 27 is a diagram illustrative of an operation example in the first configuration example.

FIG. 27 is a diagram illustrative of an operation example in the first configuration example.

FIG. 27 shows an example of a line inversion drive in which the polarity is reversed in units of one horizontal scan period.

The voltage change period starts when the common electrode voltage VCOM changes to the H level. The line value LD2 in the voltage change period is indicated by $A_0$. $A_0$ is the line value (preceding line value) in the horizontal scan period immediately before the common electrode voltage VCOM changes from the L level to the H level. Therefore, the supply capability of the high-potential-side voltage VCOMH is controlled based on the control information set in the power supply capability setting register 160 in which the line value corresponds to $A_0$. The supply capability control includes at least one of the above-described control operations.

In the subsequent grayscale output period, $(B_0+f(A_0))$ is input as the line value LD1. $B_0$ is the line value in the present horizontal scan period. Therefore, the supply capability of the high-potential-side voltage VCOMH is controlled based on the control information set in the power supply capability setting register 160 in which the line value corresponds to $(B_0+f(A_0))$. The supply capability control includes at least one of the above-described control operations.

The voltage change period again starts when the common electrode voltage VCOM changes to the L level. In this voltage change period, the preceding line value $B_0$ is input as the line value LD2. Therefore, the supply capability of the low-potential-side voltage VCOML is controlled based on the control information set in the power supply capability setting register 160 in which the line value corresponds to $B_0$. The supply capability control includes at least one of the above-described control operations.

In the subsequent grayscale output period, $(B_1+f(B_0))$ is input as the line value LD1. $B_1$ is the line value in the present horizontal scan period. Therefore, the supply capability of the low-potential-side voltage VCOML is controlled based on the control information set in the power supply capability setting register 160 in which the line value corresponds to $(B_1+f(B_0))$. The supply capability control includes at least one of the above-described control operations.

2.5 Second Configuration Example

A second configuration example shows the case of controlling the supply capability of the common electrode voltage VCOM when performing a field inversion drive.

Figure 28:
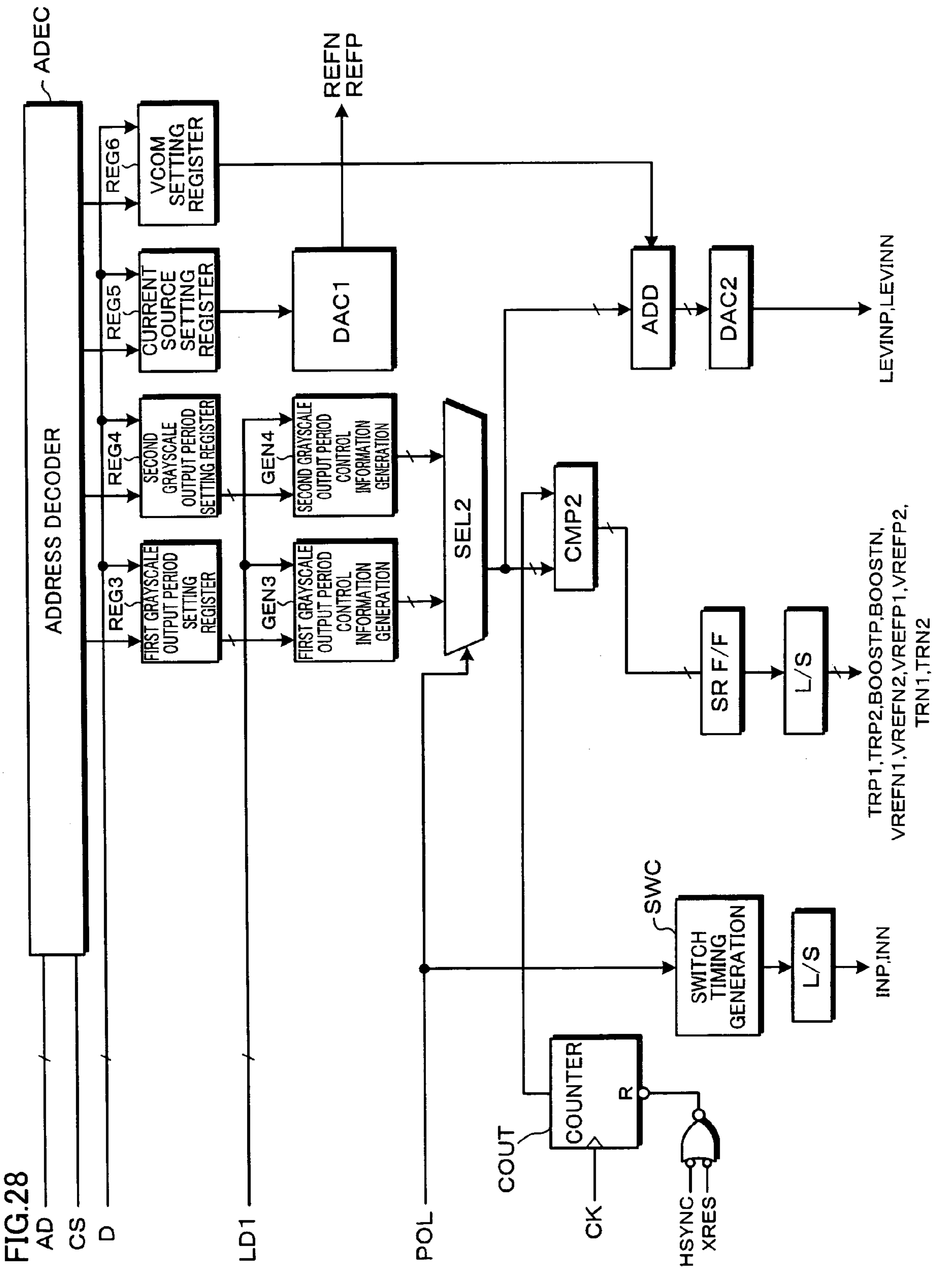
FIG. 28 is a block diagram showing a configuration example of a power supply control circuit according to a second configuration example.

FIG. 28 is a block diagram showing a configuration example of a power supply control circuit according to the second configuration example. The power supply control circuit corresponds to the power supply control circuit 150 shown in FIG. 13. In FIG. 28, sections the same as the sections shown in FIG. 24 are indicated by the same symbols. Description of these sections is appropriately omitted.

In FG. 28, the positive and negative voltage change period control information is not set in the power supply capability setting register shown in FIG. 24. The power supply control circuit acquires the grayscale output period line value LD1 from the data driver 30, and controls the supply capability of the common electrode voltage VCOM based on the acquired line value.

When performing a field inversion drive, the supply capability of the common electrode voltage VCOM is controlled corresponding to the line data or the like only in the grayscale output period. In the field inversion drive, the polarity of the common electrode voltage VCOM does not change between the preceding horizontal scan period and the present horizontal scan period. Therefore, the line value may be a value obtained by subtracting the preceding line from the present line value or a value obtained by correcting the resulting value.

Other details are the same as those of the grayscale output period control information shown in FIG. 24. Therefore, detailed description is omitted.

Figure 29:
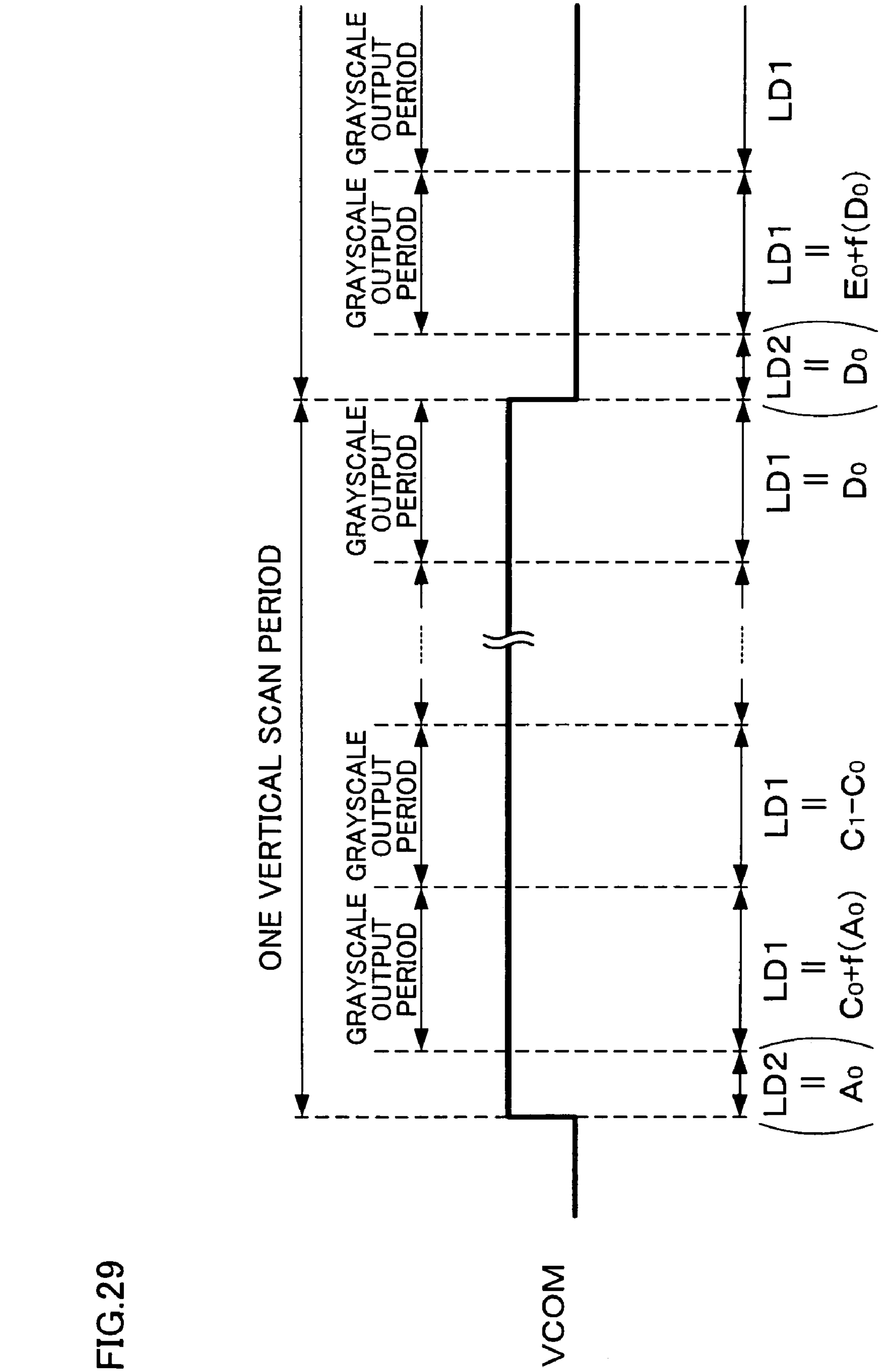
FIG. 29 is a diagram illustrative of an operation example in the second configuration example.

FIG. 29 is a diagram illustrative of an operation example in the second configuration example.

The grayscale output period starts when a certain period has elapsed after the common electrode voltage VCOM has changed to the H level. In the grayscale output period, $(C_0+f(A_0))$ is input as the line value LD1. $C_0$ is the line value in the present horizontal scan period. $A_0$ is the preceding line value. Therefore, the supply capability of the high-potential-side voltage VCOMH is controlled based on the control information set in the power supply capability setting register 160 in which the line value corresponds to $(C_0+f(A_0))$. The supply capability control includes at least one of the above-described control operations.

The next horizontal scan period is also the grayscale output period. Therefore, $(C_1-C_0)$ is input as the line value LD1. $C_1$ is the line value in the present horizontal scan period. Therefore, the supply capability of the high-potential-side voltage VCOMH is controlled based on the control information set in the power supply capability setting register 160 in which the line value corresponds to $(C_1-C_0)$. The supply capability control includes at least one of the above-described control operations.

Likewise, the supply capability of the high-potential-side voltage VCOMH is controlled in each grayscale output period in the present vertical scan period.

When the next vertical scan period starts, the common electrode voltage VCOM changes to the L level. In the grayscale output period, ($E_0$+f($D_0$)) is input as the line value LD1. $E_0$ is the line value in the present horizontal scan period. $D_0$ is the preceding line value. Therefore, the supply capability of the low-potential-side voltage VCOML is controlled based on the control information set in the power supply capability setting register 160 in which the line value corresponds to ($E_0$+f($D_0$)). The supply capability control includes at least one of the above-described control operations.

Likewise, the supply capability of the high-potential-side voltage VCOMH is controlled in each grayscale output period in the present vertical scan period.

In the voltage change period in which the common electrode voltage VCOM changes, the supply capability may be controlled in the same manner as in the voltage change period during the line inversion drive described with reference to FIGS. 24 to 27.

FIG. 27 shows an example of reversing the polarity in units of one horizontal scan period. When reversing the polarity in units of two or more horizontal scan periods, the supply capability may be controlled in the horizontal scan period after the grayscale output period in the same manner as in the field inversion drive shown in FIG. 29.

3. Electronic Instrument

Figure 30:
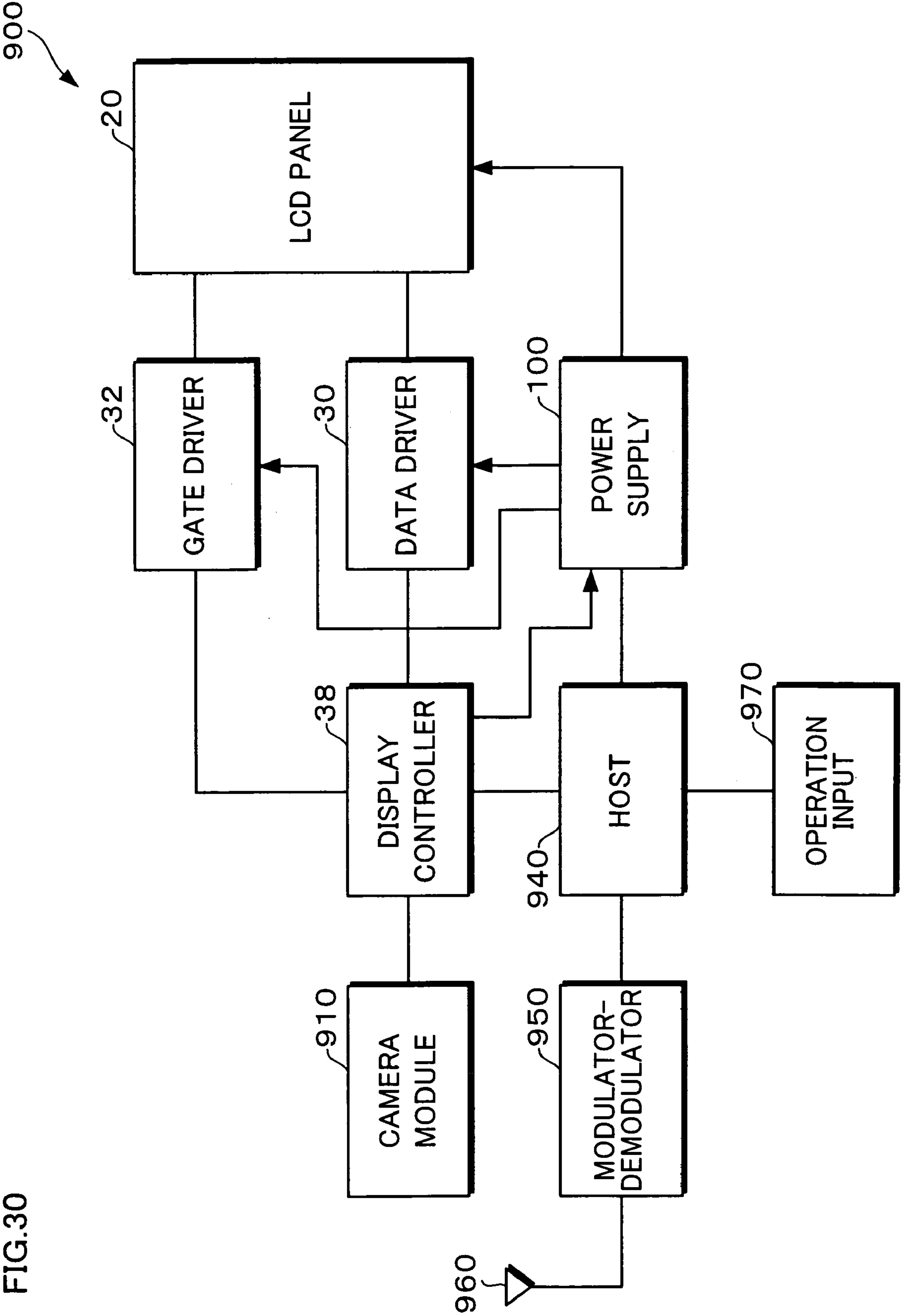
FIG. 30 is a block diagram showing a configuration example of an electronic instrument according to one embodiment of the invention.

FIG. 30 is a block diagram showing a configuration example of an electronic instrument according to one embodiment of the invention. FIG. 30 is a block diagram showing a configuration example of a portable telephone as an example of the electronic instrument. In FIG. 30, sections the same as the sections shown in FIG. 1 or 2 are indicated by the same symbols. Description of these sections is appropriately omitted.

A portable telephone 900 includes a camera module 910. The camera module 910 includes a CCD camera, and supplies data of an image captured by using the CCD camera to the display controller 38 in a YUV format.

The portable telephone 900 includes the LCD panel 20. The LCD panel 20 is driven by the data driver 30 and the gate driver 32. The LCD panel 20 includes scan lines, source lines, and pixels.

The display controller 38 is connected with the data driver 30 and the gate driver 32, and supplies grayscale data to the data driver 30 in an RGB format.

The power supply circuit 100 is connected with the data driver 30 and the gate driver 32, and supplies drive power supply voltages to the data driver 30 and the gate driver 32. The power supply circuit 100 supplies the common electrode voltage VCOM to the common electrode of the LCD panel 20.

A host 940 is connected with the display controller 38. The host 940 controls the display controller 38. The host 940 demodulates grayscale data received through an antenna 960 using a modulator-demodulator section 950, and supplies the demodulated grayscale data to the display controller 38. The display controller 38 causes the data driver 30 and the gate driver 32 to display an image in the LCD panel 20 based on the grayscale data.

The host 940 modulates grayscale data generated by the camera module 910 using the modulator-demodulator section 950, and directs transmission of the modulated data to another communication device through the antenna 960.

The host 940 performs transmission/reception processing of grayscale data, imaging using the camera module 910, and display processing of the LCD panel 20 based on operational information from an operation input section 970.

The invention is not limited to the above-described embodiments. Various modifications and variations may be made within the spirit and scope of the invention. The above-described embodiments illustrate the power supply circuit which supplies voltage to the common electrode. However, the invention is not limited to the power supply circuit which supplies voltage to the common electrode.

Part of requirements of any claim of the invention could be omitted from a dependent claim which depends on that claim. Moreover, part of requirements of any independent claim of the invention could be made to depend on any other independent claim.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A power supply circuit that supplies voltage to a common electrode that is opposite to a pixel electrode, an electro-optical substance being interposed between the common electrode and the pixel electrode, the power supply circuit comprising:

a high-potential-side voltage generation circuit that generates a high-potential-side voltage to be supplied to the common electrode;

a low-potential-side voltage generation circuit that generates a low-potential-side voltage to be supplied to the common electrode;

a switch circuit that alternately supplies the high-potential-side voltage and the low-potential-side voltage to the common electrode as a common electrode voltage; and a first conductivity type first auxiliary transistor that has a source and a drain, a high-potential-side power supply voltage of the high-potential-side voltage generation circuit being supplied at the source, and the drain being electrically connected to an output of the switch circuit, the power supply circuit performing supply capability control of the common electrode voltage that changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode, and the supply capability control being preformed by changing a gate voltage of the first auxiliary transistor according to the line data.

2. The power supply circuit as defined in claim 1, the high-potential-side voltage generation circuit including a first operational amplifier that outputs the high-potential-side voltage based on a high-potential-side input voltage.

3. The power supply circuit as defined in claim 2, the supply capability control being performed by changing at least one of current drive capability and a slew rate of the first operational amplifier according to the line data.

4. The power supply circuit as defined in claim 2, the supply capability control being performed by changing the high-potential-side input voltage according to the line data.

5. The power supply circuit as defined in claim 2, the supply capability control being performed by stopping or limiting an operating current of the first operational amplifier and electrically connecting an input and an output of the first operational amplifier according to the line data.

6. The power supply circuit as defined in claim 1, the low-potential-side voltage generation circuit including a second operational amplifier that outputs the low-potential-side voltage based on a low-potential-side input voltage.

7. The power supply circuit as defined in claim 6, the supply capability control being performed by changing at least one of current drive capability and a slew rate of the second operational amplifier according to the line data.

8. The power supply circuit as defined in claim 6, the supply capability control being performed by changing the low-potential-side input voltage according to the line data.

9. The power supply circuit as defined in claim 6, the supply capability control being performed by stopping or limiting an operating current of the second operational amplifier and electrically connecting an input and an output of the second operational amplifier according to the line data.

10. The power supply circuit as defined in claim 1, comprising:

a second charge-pump circuit that generates a low-potential-side power supply voltage of the low-potential-side voltage generation circuit by a charge-pump operation in synchronization with a second charge clock signal, the supply capability control being performed by stopping the second charge clock signal or reducing frequency of the second charge clock signal according to the line data.

11. The power supply circuit as defined in claim 1, the supply capability control being performed only in a period determined based on the line data.

12. The power supply circuit as defined in claim 1, the supply capability control being performed according to an amount of change for one scan line between the line data in a present horizontal scan period and the line data in a horizontal scan period immediately before the present horizontal scan period, instead of the line data.

13. The power supply circuit as defined in claim 12, the supply capability control being performed in a period corresponding to the amount of change for one scan line between the line data in the present horizontal scan period and the line data in the horizontal scan period immediately before the present horizontal scan period.

14. The power supply circuit as defined in claim 1, the line data including the grayscale data for the number of a part of dots of one scan line.

15. The power supply circuit as defined in claim 1, the line data including higher-order k-bit (k<j, k is an integer greater than zero) data of the grayscale data of each dot for the number of dots of one scan line when the grayscale data of each dot is j bits (j is an integer greater than one).

16. The power supply circuit as defined in claim 15, k being one.

17. A display driver comprising:

a driver circuit that supplies a drive voltage corresponding to grayscale data to a data line electrically connected to the pixel electrode; and the power supply circuit as defined in claim 1 that performs the supply capability control by using the line data corresponding to the grayscale data.

18. An electro-optical device comprising:

a plurality of scan lines;

a plurality of data lines;

a plurality of pixel electrodes, each of the pixel electrodes being specified by one of the scan lines and one of the data lines;

a common electrode that is opposite to the pixel electrodes, an electro-optical substance being interposed between the common electrode and the pixel electrodes;

a display driver that drives the data lines; and the power supply circuit as defined in claim 1 that alternately supplies the high-potential-side voltage and the low-potential-side voltage to the common electrode.

19. An electronic instrument comprising the power supply circuit as defined in claim 1.

20. A method of controlling a power supply circuit, the power supply circuit including a high-potential-side voltage generation circuit and a low-potential-side voltage generation circuit, the high-potential-side voltage generation circuit generating a high-potential-side voltage to be supplied to a common electrode that is opposite to a pixel electrode, an electro-optical substance being interposed between the common electrode and the pixel electrode, the low-potential-side voltage generation circuit generating a low-potential-side voltage to be supplied to the common electrode, and a first conductivity type first auxiliary transistor that has a source and a drain, a high-potential-side power supply voltage of the high-potential-side voltage generation circuit being supplied at the source, and the drain being electrically connected to an output of the switch circuit, and the method comprising:

changing at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode; and alternately supplying the high-potential-side voltage and the low-potential-side voltage to the common electrode, the at least one being changed by changing a gate voltage of the first auxiliary transistor according to the line data.

21. The method of controlling a power supply circuit as defined in claim 20, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit being changed only in a period determined based on the line data.

22. The method of controlling a power supply circuit as defined in claim 20, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit being changed according to an amount of change for one scan line between the line data in a present horizontal scan period and the line data in a horizontal scan period immediately before the present horizontal scan period.

23. The method of controlling a power supply circuit as defined in claim 22, at least one of the current drive capability of the high-potential-side voltage generation circuit, the output voltage level of the high-potential-side voltage generation circuit, the current drive capability of the low-potential-side voltage generation circuit, and the output voltage level of the low-potential-side voltage generation circuit being changed only in a period corresponding to the amount of change for one scan line between the line data in the present horizontal scan period and the line data in the horizontal scan period immediately before the present horizontal scan period.

24. The method of controlling a power supply circuit as defined in claim 20, the line data including the grayscale data for the number of a part of dots of one scan line.

25. The method of controlling a power supply circuit as defined in claim 20, the line data including higher-order k-bit (k<j, k is an integer greater than zero) data of the grayscale data of each dot for the number of dots of one scan line when the grayscale data of each dot is j bits (j is an integer greater than one).

26. The method of controlling a power supply circuit as defined in claim 25, k being one.

27. A power supply circuit that supplies voltage to a common electrode that is opposite to a pixel electrode, an electro-optical substance being interposed between the common electrode and the pixel electrode, the power supply circuit comprising:

a high-potential-side voltage generation circuit that generates a high-potential-side voltage to be supplied to the common electrode;

a low-potential-side voltage generation circuit that generates a low-potential-side voltage to be supplied to the common electrode;

a switch circuit that alternately supplies the high-potential-side voltage and the low-potential-side voltage to the common electrode as a common electrode voltage; and a second conductivity type second auxiliary transistor that has a source and a drain, a low-potential-side power supply voltage of the low-potential-side voltage generation circuit being supplied at the source, and the drain being electrically connected to an output of the switch circuit, the power supply circuit performing supply capability control of the common electrode voltage that changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode, and the supply capability control being performed by changing a gate voltage of the second auxiliary transistor according to the line data.

28. A power supply circuit that supplies voltage to a common electrode that is opposite to a pixel electrode, an electro-optical substance being interposed between the common electrode and the pixel electrode, the power supply circuit comprising:

a high-potential-side voltage generation circuit that generates a high-potential-side voltage to be supplied to the common electrode;

a low-potential-side voltage generation circuit that generates a low-potential-side voltage to be supplied to the common electrode;

a switch circuit that alternately supplies the high-potential-side voltage and the low-potential-side voltage to the common electrode as a common electrode voltage; and a first charge-pump circuit that generates a high-potential-side power supply voltage of the high-potential-side voltage generation circuit by a charge-pump operation in synchronization with a first charge clock signal, the power supply circuit performing supply capability control of the common electrode voltage that changes at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode, and the supply capability control being performed by stopping the first charge clock signal or reducing frequency of the first charge clock signal according to the line data.

29. A method of controlling a power supply circuit, the power supply circuit including a high-potential-side voltage generation circuit and a low-potential-side voltage generation circuit, the high-potential-side voltage generation circuit generating a high-potential-side voltage to be supplied to a common electrode that is opposite to a pixel electrode, an electro-optical substance being interposed between the common electrode and the pixel electrode, the low-potential-side voltage generation circuit generating a low-potential-side voltage to be supplied to the common electrode, and a second conductivity type second auxiliary transistor that has a source and a drain, a low-potential-side power supply voltage of the low-potential-side voltage generation circuit being supplied at the source, and the drain being electrically connected to an output of the switch circuit, and the method comprising:

changing at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode; and alternately supplying the high-potential-side voltage and the low-potential-side voltage to the common electrode, the at least one being changed by changing a gate voltage of the second auxiliary transistor according to the line data.

30. A method of controlling a power supply circuit, the power supply circuit including a high-potential-side voltage generation circuit and a low-potential-side voltage generation circuit, the high-potential-side voltage generation circuit generating a high-potential-side voltage to be supplied to a common electrode that is opposite to a pixel electrode, an electro-optical substance being interposed between the common electrode and the pixel electrode, the low-potential-side voltage generation circuit generating a low-potential-side voltage to be supplied to the common electrode, and a first charge-pump circuit that generates a high-potential-side power supply voltage of the high-potential-side voltage generation circuit by a charge-pump operation in synchronization with a first charge clock signal, and the method comprising:

changing at least one of current drive capability of the high-potential-side voltage generation circuit, an output voltage level of the high-potential-side voltage generation circuit, current drive capability of the low-potential-side voltage generation circuit, and an output voltage level of the low-potential-side voltage generation circuit according to line data including grayscale data for the number of dots of one scan line, each dot corresponding to voltage applied to the pixel electrode; and alternately supplying the high-potential-side voltage and the low-potential-side voltage to the common electrode, and the at least one being changed by stopping the first charge clock signal or reducing frequency of the first charge clock signal according to the line data.

* * * * *